(12) United States Patent
Masuyama et al.

(10) Patent No.: US 6,641,482 B2
(45) Date of Patent: Nov. 4, 2003

(54) PORTABLE GAME APPARATUS WITH ACCELERATION SENSOR AND INFORMATION STORAGE MEDIUM STORING A GAME PROGRAM

(75) Inventors: Iwao Masuyama, Kyoto (JP); Toshiaki Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 10/043,164

(22) Filed: Jan. 14, 2002

(65) Prior Publication Data

US 2002/0072418 A1 Jun. 13, 2002

Related U.S. Application Data

(63) Continuation of application No. 09/512,322, filed on Feb. 24, 2000, now Pat. No. 6,375,572.
(60) Provisional application No. 60/168,672, filed on Dec. 3, 1999.

(30) Foreign Application Priority Data

Oct. 4, 1999 (JP) .......................................... 11-282592

(51) Int. Cl.[7] .................................................. A63F 9/22
(52) U.S. Cl. .......................................... 463/44; 463/43
(58) Field of Search ........................ 463/30–31, 36–38, 463/43–44

(56) References Cited

U.S. PATENT DOCUMENTS

| 4,318,245 A | 3/1982 | Stowell et al. |
| 4,337,948 A | 7/1982 | Breslow et al. |
| 4,425,488 A | 1/1984 | Moskin et al. |
| 4,450,325 A | 5/1984 | Luque |
| 4,503,299 A | 3/1985 | Henrard et al. |
| 4,540,176 A | 9/1985 | Baer |
| 4,787,051 A | 11/1988 | Olson |
| 4,839,838 A | 6/1989 | LaBiche et al. |
| 4,957,291 A | 9/1990 | Miffitt et al. |
| 4,969,647 A | 11/1990 | Mical et al. |
| 5,059,958 A | 10/1991 | Jacobs et al. |
| 5,068,645 A | 11/1991 | Drumm |
| 5,128,671 A | 7/1992 | Thomas, Jr. |
| 5,181,181 A | 1/1993 | Glynn |
| 5,184,830 A | 2/1993 | Okada et al. |
| 5,329,276 A | 7/1994 | Hirabayashi |
| 5,339,095 A | 8/1994 | Redford |
| 5,363,120 A | 11/1994 | Drumm |
| 5,453,758 A | 9/1995 | Sato |
| 5,526,022 A | 6/1996 | Donahue et al. |
| 5,598,187 A | 1/1997 | Ide et al. |
| 5,611,731 A | 3/1997 | Bouton et al. |
| 5,615,132 A | 3/1997 | Horton et al. |
| 5,624,117 A | 4/1997 | Ohkubo et al. |
| 5,666,138 A | 9/1997 | Culver |

(List continued on next page.)

FOREIGN PATENT DOCUMENTS

JP 60-7128 1/1985

OTHER PUBLICATIONS

"Low Cost ±2 g/±10 g Dual Axis iMEMS® Accelerometers with Digital Output", Analog Devices, Inc. 1999, pp. 1–11.

*Primary Examiner*—Jessica Harrison
*Assistant Examiner*—Carmen D. White
(74) *Attorney, Agent, or Firm*—Nixon & Vanderhye, PC

(57) ABSTRACT

A portable game apparatus includes a housing is provided with an LCD and an insertion hole. A cartridge incorporating a program ROM is inserted in the insertion hole. A CPU in the housing processes a game program to display game scenes on the LCD. The cartridge further incorporates an acceleration sensor. The acceleration sensor detects movement and tilt of the housing. When the housing is positioned at an angle easy to play, if an operation key is operated, neutral position data is stored to an internal RAM. During game play, an output of the acceleration sensor is corrected by the neutral position data so that the CPU controls game scene display according to a corrected output of the acceleration sensor.

4 Claims, 44 Drawing Sheets

U.S. PATENT DOCUMENTS

| | | |
|---|---|---|
| 5,701,131 A | 12/1997 | Kuga |
| 5,703,623 A | 12/1997 | Hall et al. |
| 5,734,371 A | 3/1998 | Kaplan |
| 5,734,373 A | 3/1998 | Rosenberg et al. |
| 5,739,811 A | 4/1998 | Rosenberg et al. |
| 5,746,602 A | 5/1998 | Kikinis |
| 5,751,273 A | 5/1998 | Cohen |
| 5,752,880 A | 5/1998 | Gabai et al. |
| 5,757,360 A | 5/1998 | Nitta et al. |
| 5,795,227 A | 8/1998 | Raviv et al. |
| 5,819,206 A | 10/1998 | Horton et al. |
| 5,835,077 A | 11/1998 | Dao et al. |
| 5,854,622 A | 12/1998 | Brannon |
| 5,898,421 A | 4/1999 | Quinn |
| 5,903,257 A | 5/1999 | Nishiumi et al. |
| 5,923,317 A | 7/1999 | Sayler et al. |
| 5,926,438 A * | 7/1999 | Saito .......................... 367/111 |
| 5,947,868 A | 9/1999 | Dugan |
| 5,955,713 A | 9/1999 | Titus et al. |
| 5,982,352 A | 11/1999 | Pryor |
| 5,991,085 A | 11/1999 | Rallison et al. |
| 5,999,168 A | 12/1999 | Rosenberg et al. |
| 6,020,876 A | 2/2000 | Rosenberg et al. |
| 6,160,540 A | 12/2000 | Fishkin et al. |
| 6,183,365 B1 | 2/2001 | Tonomura et al. |
| 6,200,219 B1 | 3/2001 | Rudell et al. |
| 6,201,554 B1 | 3/2001 | Lands |

* cited by examiner

FIG. 16
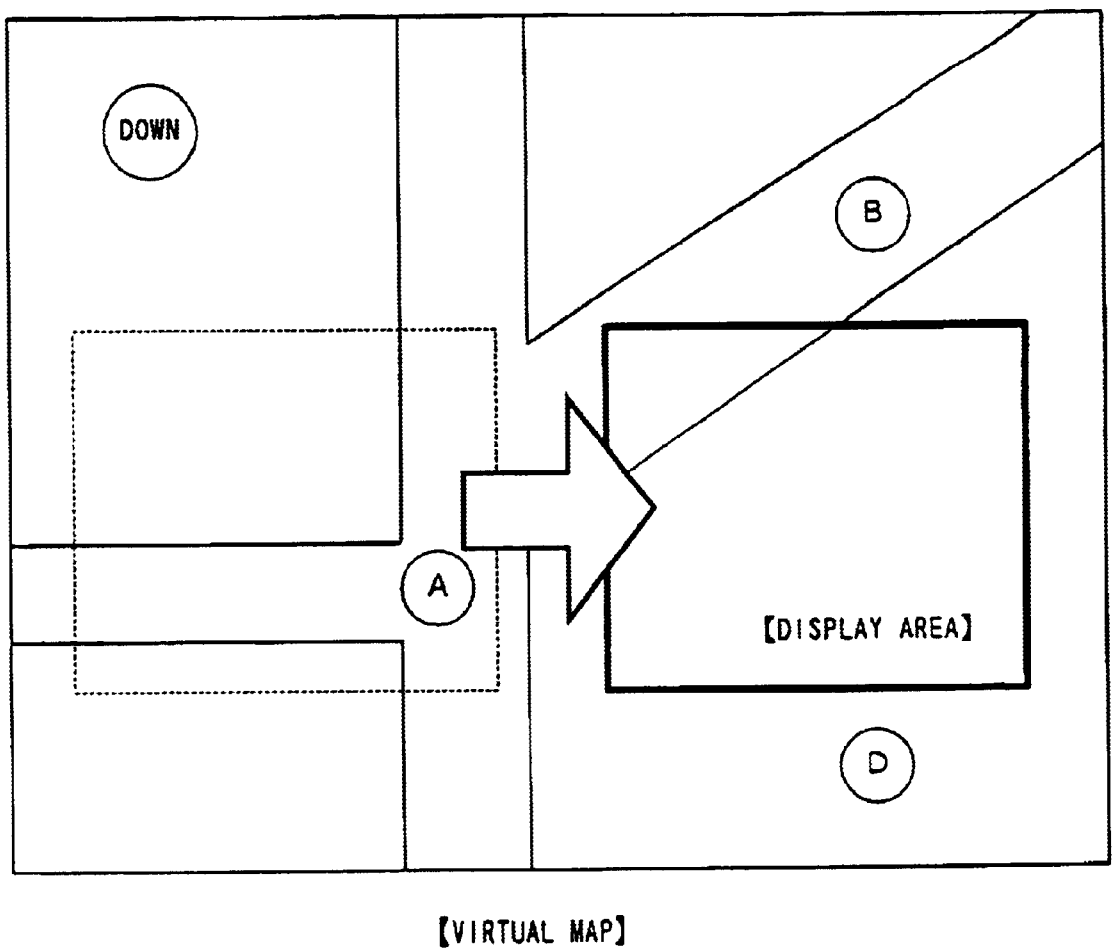
[VIRTUAL MAP]
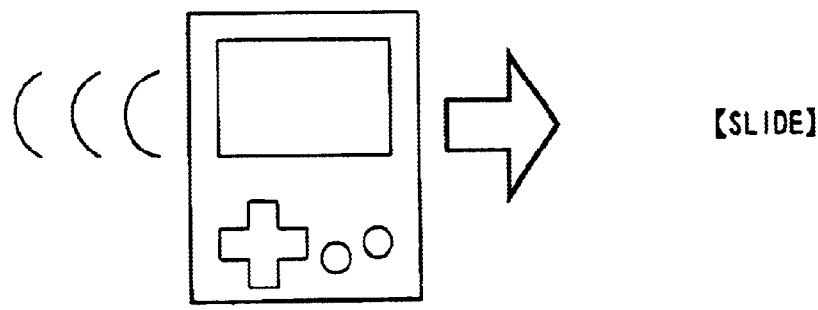
[SLIDE]

FIG. 19
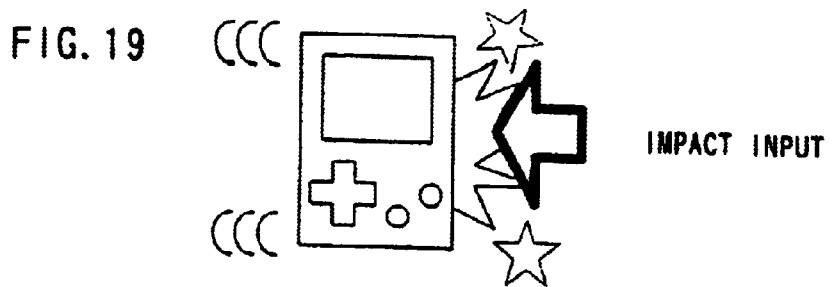
IMPACT INPUT
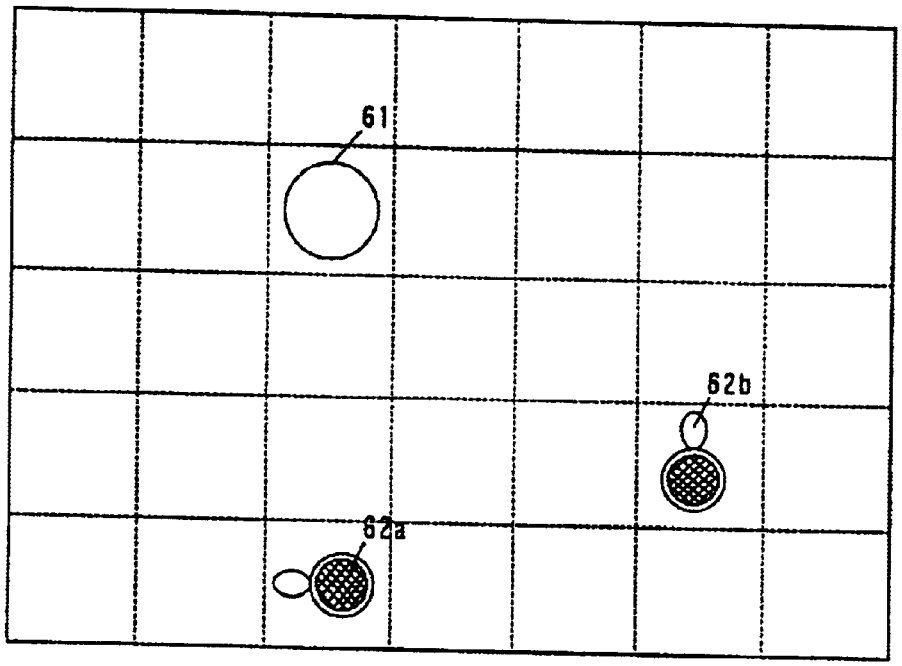
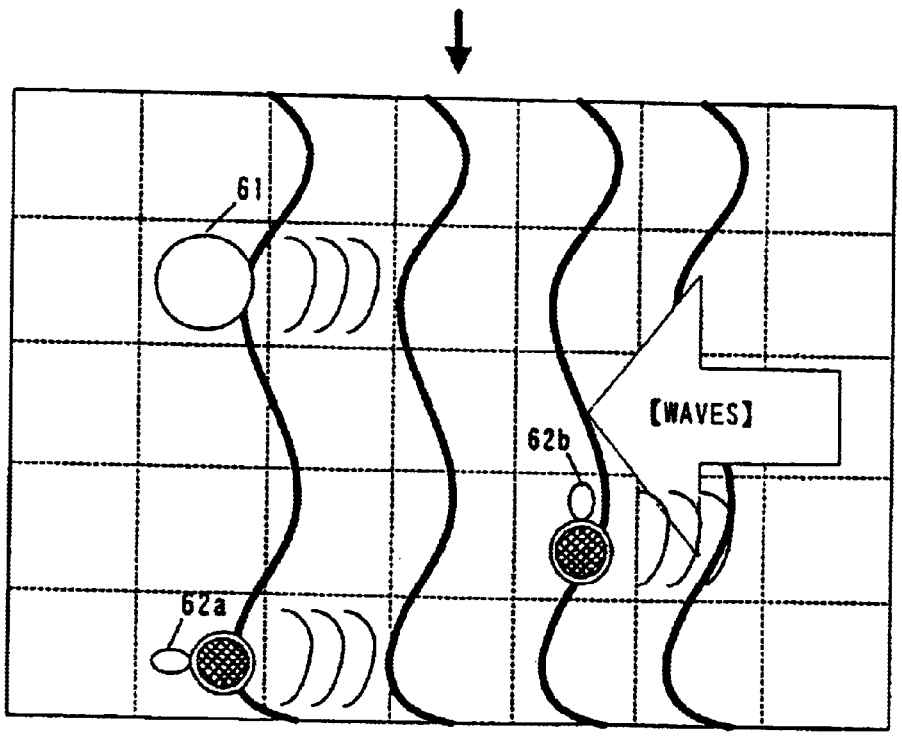
[WAVES]

FIG. 20
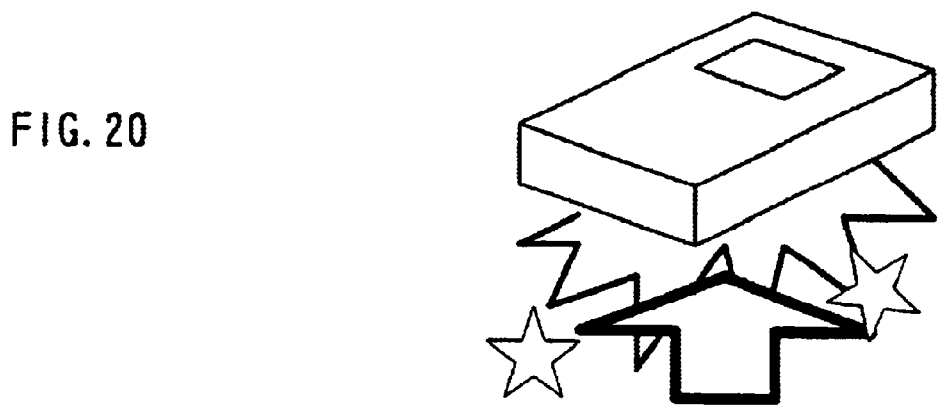
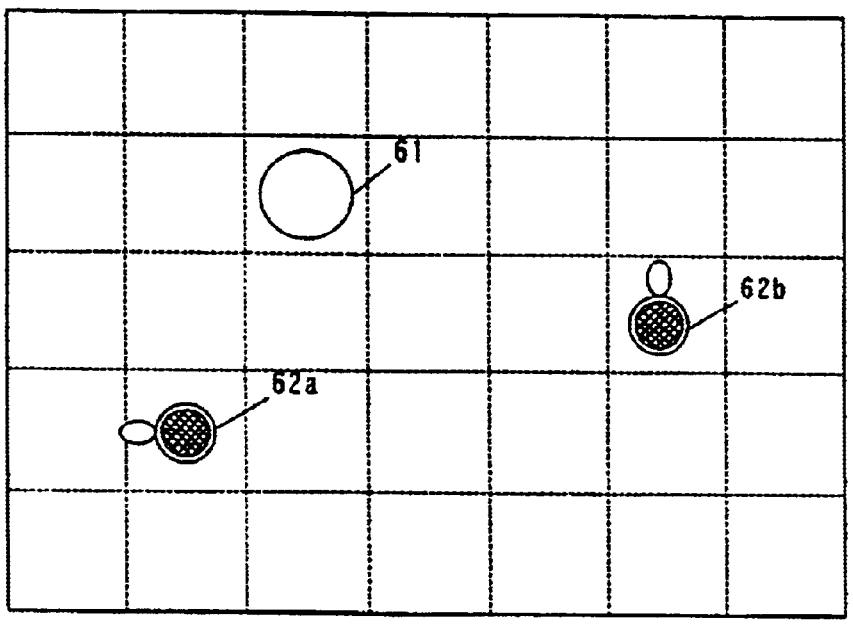
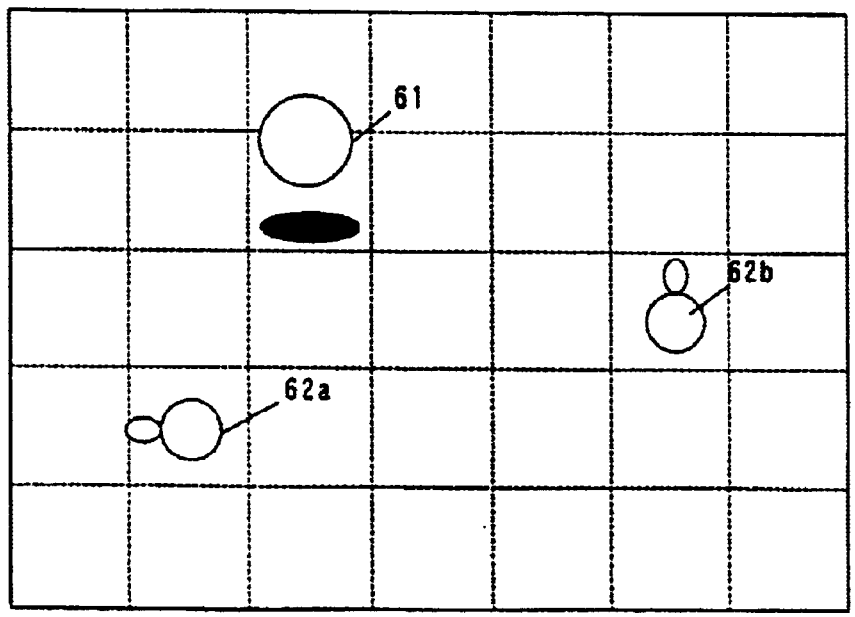

FIG. 25

RECOMMENDED POSITION SET PROCESSING TABLE

| | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | SIGHT X COORDINATE (Sx) | ×1 | NONE | NONE | NONE | NONE |
| SENSOR OUTPUT VALUE Y (INy) | SIGHT Y COORDINATE (Sy) | ×1 | NONE | NONE | NONE | NONE |
| Z-AXIS CONTACT SW OUTPUT VALUE (INz) | IGNORED | NONE | NONE | NONE | NONE | NONE |
| IMPACT INPUT FLAG (FS) | IGNORED | NONE | NONE | NONE | NONE | NONE |

FIG. 26

GAME MAP SELECT PROCESSING TABLE

| | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | CAMERA X COORDINATE (Cx) CHANGE AMOUNT | ×2 | NONE | NONE | NONE | NONE |
| SENSOR OUTPUT VALUE Y (INy) | CAMERA Y COORDINATE (Cy) CHANGE AMOUNT | ×2 | NONE | NONE | NONE | NONE |
| Z-AXIS CONTACT SW OUTPUT VALUE (INz) | MAP DECISION | NONE | NONE | NONE | NONE | NONE |
| IMPACT INPUT FLAG (FS) | IGNORED | NONE | NONE | NONE | NONE | NONE |

FIG. 27

PLAYER CHARACTER MOVING TABLE

| | UTILIZATION METHOD | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | IGNORED | NONE | NONE | NONE | NONE | NONE |
| SENSOR OUTPUT VALUE Y (INy) | IGNORED | NONE | NONE | NONE | NONE | NONE |
| Z-AXIS CONTACT SW OUTPUT VALUE (INz) | Z MOVING ACCELERATION CHANGE AMOUNT (dAz) | ×1 | NONE | NONE | NONE | NONE |
| IMPACT INPUT FLAG (FS) | IGNORED | NONE | NONE | NONE | NONE | NONE |

FIG. 28

PLAYER CHARACTER MOVING TABLE (ON-FLOOR)

| | UTILIZATION | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | X MOVING ACCELERATION CHANGE AMOUNT (dAx) | ×2 | INx>20 | 40 | NONE | NONE |
| SENSOR OUTPUT VALUE Y (INy) | Y MOVING ACCELERATION CHANGE AMOUNT (dAy) | ×2 | INy>20 | 40 | NONE | NONE |
| Z-AXIS CONTACT SW OUTPUT VALUE (INz) | Z MOVING ACCELERATION CHANGE AMOUNT (dAz) | ×1 | NONE | NONE | NONE | NONE |
| IMPACT INPUT FLAG (FS) | X, Y MOVING ACCELERATION CHANGE AMOUNTS (dAx, dAy) | ×3 | NONE | NONE | NONE | NONE |

FIG. 29

PLAYER CHARACTER MOVING TABLE (ON-ICE)

| | UTILIZATION | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | X MOVING ACCELERATION CHANGE AMOUNT (dAx) | ×3 | INx>20 | 60 | NONE | NONE |
| SENSOR OUTPUT VALUE Y (INy) | Y MOVING ACCELERATION CHANGE AMOUNT (dAy) | ×3 | INy>20 | 60 | NONE | NONE |
| Z-AXIS CONTACT SW OUTPUT VALUE (INz) | Z MOVING ACCELERATION CHANGE AMOUNT (dAz) | ×1 | NONE | NONE | NONE | NONE |
| IMPACT INPUT FLAG (FS) | X,Y MOVING ACCELERATION CHANGE AMOUNT (dAx, dAy) | ×5 | NONE | NONE | NONE | NONE |

FIG. 30

PLAYER CHARACTER MOVING TABLE (UNDER-WATER)

| | UTILIZATION | CORRECTION RATIO | PARTICULAR CORRECTION CONDITION 1 | PARTICULAR CORRECTION NUMBER 1 | PARTICULAR CORRECTION CONDITION 2 | PARTICULAR CORRECTION NUMBER 2 |
|---|---|---|---|---|---|---|
| SENSOR OUTPUT VALUE X (INx) | X MOVING ACCELERATION CHANGE AMOUNT (dAx) | × 1/2 | INx>10 | 5 | NONE | NONE |
| SENSOR OUTPUT VALUE Y (INy) | Y MOVING ACCELERATION CHANGE AMOUNT (dAy) | × 1/2 | INy>10 | 5 | NONE | NONE |
| Z-AXIS CONTACT SW OUTPUT VALUE (INz) | Z MOVING ACCELERATION CHANGE AMOUNT (dAz) | × 1 | NONE | NONE | NONE | NONE |
| IMPACT INPUT FLAG (FS) | IGNORED | NONE | NONE | NONE | NONE | NONE |

FIG. 31

NPC MOVING TABLE (FOR TORTOISE NORMAL POSITION)

| | UTILIZATION | CORRECTION RATIO | PARTICULAR CORRECTION CONDITION1 | PARTICULAR CORRECTION NUMBER 1 | PARTICULAR CORRECTION CONDITION2 | PARTICULAR CORRECTION NUMBER 2 |
|---|---|---|---|---|---|---|
| SENSOR OUTPUT VALUE X (INx) | X MOVING ACCELERATION CHANGE AMOUNT (dAx) | × 1/2 | INx<10 | 0 | INx>20 | 10 |
| SENSOR OUTPUT VALUE Y (INy) | Y MOVING ACCELERATION CHANGE AMOUNT (dAy) | × 1/2 | INy<10 | 0 | INy>20 | 10 |
| Z-AXIS CONTACT SW OUTPUT VALUE (INz) | POSITION INVERSION | NONE | NONE | NONE | NONE | NONE |
| IMPACT INPUT FLAG (FS) | IGNORED | NONE | NONE | NONE | NONE | NONE |

FIG. 32

NPC MOVING TABLE (FOR TORTOISE UPSIDE-DOWN POSITION)

| | UTILIZATION | CORRECTION RATIO | PARTICULAR CORRECTION CONDITION1 | PARTICULAR CORRECTION NUMBER 1 | PARTICULAR CORRECTION CONDITION2 | PARTICULAR CORRECTION NUMBER 2 |
|---|---|---|---|---|---|---|
| SENSOR OUTPUT VALUE X (INx) | X MOVING ACCELERATION CHANGE AMOUNT (dAx) | × 2 | INx>20 | 40 | NONE | NONE |
| SENSOR OUTPUT VALUE Y (INy) | Y MOVING ACCELERATION CHANGE AMOUNT (dAy) | × 2 | INy>20 | 40 | NONE | NONE |
| Z-AXIS CONTACT SW OUTPUT VALUE (INz) | POSITION INVERSION | NONE | NONE | NONE | NONE | NONE |
| IMPACT INPUT FLAG (FS) | IGNORED | NONE | NONE | NONE | NONE | NONE |

PORTABLE GAME APPARATUS WITH ACCELERATION SENSOR AND INFORMATION STORAGE MEDIUM STORING A GAME PROGRAM

This application claims the benefit of Provisional Application No. 60/168,172, filed Dec. 3, 1999, the entire content of which is hereby incorporated by reference in this application.

This application is a continuation of application Ser. No. 09/512,322, filed Feb. 24, 2000, now U.S. Pat. No. 6,375,572 the entire content of which is hereby incorporated by reference in this application.

BACKGROUND OF THE INVENTION

1. Field of the Invention

This invention relates to a portable game apparatus with an acceleration sensor and information storage medium storing a game program, and more particularly to a portable game apparatus and information storage medium storing a game program wherein tilting or movement of the portable game apparatus is detected by an acceleration sensor and utilized as operational information for game control.

2. Description of the Prior Art

The conventional portable game apparatuses have an input device, such as a cross key and push button so that a player can manipulate the input device while holding the portable game apparatus by hand, thereby enabling game character movement and command selection.

There are prior art devices, as disclosed in Japanese Patent Laid-open No. H8-191953 and Japanese Patent Laid-open No. H10-21000, that utilize, as a game input device, a tilt sensor or acceleration sensor. In such prior art devices, the tilt or acceleration sensor is provided on a controller which is separate from a game machine main body so as to detect movement or tilt of the controller. This allows a player to control game characters being displayed on a TV screen by moving or tilting the controller.

However, the above-described prior art devices are not directly applicable to a portable game apparatus. This is because the acceleration sensor or the like is added on the video game apparatus controller having a display, such as a television receiver, separate from the game apparatus main body. The portable game apparatus includes a display, such as an LCD, and adapted to be gripped for game play on housing ends by the hands of the user. It is a usual practice for the player to play a game while holding the portable game apparatus such that it has a tilt relative to the horizontal position, in a manner facilitating viewing of the LCD display. However, when the portable game apparatus is tilted relative to the horizontal, the acceleration sensor would detect acceleration even when no intentional acceleration input (or tilt input) is given by the player. In addition, the tilt angle of a portable game apparatus differs due to a variety of factors, such as a difference between individual players, light source position of electric light or the like, game content, player's game playing posture, and so on.

SUMMARY OF THE INVENTION

It is therefore a primary object of the present invention to provide a novel portable game apparatus with an acceleration sensor.

Another object of the invention is to provide a portable game apparatus with an acceleration sensor which can set as a neutral position a tilted position of the portable game apparatus used by a player, so that the player can hold it with a desired tilt that makes it easy to play a game.

Another object of the invention is to provide an information storage medium for a portable game apparatus with an acceleration sensor that stores a game program capable of setting a neutral position.

Still another object of the invention is to provide a game cartridge which can control for a game based on an output of an acceleration sensor that is simple in structure and low in cost, even where the portable game apparatus has already been produced.

A portable game apparatus according to the present invention, includes: a housing to be gripped by a hand of a player; a display arranged in one main surface of the housing to display game scenes; an acceleration sensor movable with the housing; a neutral position setter for setting a reference tilt position for the housing; a temporary storage for temporarily storing as a neutral position data an output value of the acceleration sensor corresponding to the neutral position; a corrector for correcting an output value of the acceleration sensor based on the neutral position data; and a game controller for changing a display state of a game scene to be displayed on the display based on an output value of the corrector.

Specifically, the neutral position setter includes an operation key to be operated by the player, and a program to write as the neutral position data into the temporary storage a corresponding output value of the acceleration sensor to a tilt of the housing when the player operates the operation key.

In another embodiment, the neutral position setter includes a sight display to display on the display a sight movable depending upon a tilt of the housing, and a target coordinate display to display on the display a target coordinate that the sight is to position or when the housing is in a proper tilted position, wherein the neutral position data is set by a corresponding output value of the acceleration sensor to a tilt of the housing when the sight overlaps with the target coordinate.

In this embodiment, the game scene is a scene constituted by game characters (player characters, ally characters, enemy characters and stationary characters, etc.), an environment where the game character exist ("water" for the presence of the game character underwater, etc.) and a background. The game controller varies a state of these items. For example, the player character or enemy character is displayed with movement or shape change, or the environment or background is varied or scrolled on the display.

In the portable game apparatus of the invention, prior to game play, a reference tilt of the portable game apparatus is set by the neutral position setter. The reference tilt may be set arbitrarily by the player or at a tilt previously determined by a program. Alternatively, the player may select any one of a plurality of tilts previously determined by a program. For example, where the player sets an arbitrary tilt, the player holds the portable game apparatus with a desired tilt that makes it easy to play a game and then manipulates an operation key. Thereupon, an output value of the acceleration sensor upon operating the operation key is written and held as neutral position data into the temporary storage. During the game, the output value of the acceleration sensor is corrected based on the neutral position data by the corrector. Then, the game controller changes a display state of the game scene according to the corrected acceleration sensor output. Incidentally, the neutral position setter may be configured such that a neutral position can be set in the course of game play.

According to the invention, in the portable game apparatus with an acceleration sensor, it is possible to set as a neutral position a tilt given when the player grips the portable game apparatus.

An information storage medium according to the present invention is a storage medium to be loaded on a portable game apparatus, having a display to display game scenes, a housing to be gripped by a hand of a player and arranged with the display on one main surface thereof, a processor, and stored information to be processed by the processor, including: an acceleration sensor output read program to read out an output value of the acceleration sensor; a neutral position set program for setting a reference tilt of the portable game apparatus; a write program for writing as neutral position data to a temporary storage memory a corresponding output value of the acceleration sensor to the neutral position; a correction program for correcting the acceleration sensor output value by the neutral position data; and a game control program for changing a display state of the game scene to be displayed on the display based on an output value of the correction program.

In this embodiment, prior to game play, the neutral position set program sets a reference tilt of the portable game apparatus. The acceleration sensor output read program reads out a corresponding acceleration output value to the set neutral position, and the write program writes it as neutral position data to the temporary storage. This temporary storage may be a storage in the information storage medium or a storage in the portable game apparatus. In game play, the acceleration sensor output read program reads out an acceleration sensor output value to proceed with a game process. However, the acceleration sensor output value is corrected based on the neutral position data and thereafter the game control program changes a display state of game scene.

The acceleration sensor is provided related the housing. More specifically, the information storage medium is a cartridge that can be loaded into and unloaded from the housing of the portable game apparatus, and the acceleration sensor being accommodated in the cartridge.

If the acceleration sensor is accommodated in the cartridge in this manner, it is possible to perform processing based on an acceleration sensor output with a simple structure and at low cost even where the portable game apparatus has been produced.

In the case that the portable game apparatus includes an operation key, the write program writing as the neutral position data to the temporary storage memory a corresponding output value of the acceleration sensor to a tilt of the housing when the player operates the operation key.

Furthermore, the neutral position set program includes a sight display program to display on the display a sight movable depending upon the tilt of the housing, and a target coordinate display program to display on the display a target coordinate that the sight is to be positioned on when the housing is in a proper tilt, and the neutral position data being set by a tilt of the housing when the sight overlaps with the target coordinate.

In another aspect of the invention, there is provided a portable game apparatus having a display arranged on one main surface thereof, including: a game map data storage for storing game map data to display on the display a game map as a background image; a game character data storage for storing game character data to display on the display a game character; an acceleration sensor for detecting an acceleration to thereby detect a change amount depending upon movement or tilt of the portable game apparatus; a program storage for storing program data to move and display the game character depending upon at least a tilt direction detected by the acceleration sensor; and a processor for displaying a game image on the display in a manner that changes a display state of the game character by processing based on an output of the acceleration sensor and the program.

In this portable game apparatus, the processor processes a program according to an output of the acceleration sensor whereby the game character on the display can be varied (moved, deformed) according to the acceleration sensor output.

For example, the acceleration sensor is operable to detect an acceleration due to an abrupt movement of the portable game apparatus and detects at least one of a tilt amount and a tilt direction due to a moderate tilt thereof. The program storage includes a program to move and display the game character in a manner that changes a moving amount based on a tilt amount as a detection output of the acceleration sensor.

In this case, the program storage includes a program to vary a change amount of the game character depending upon an acceleration of a detection output of the acceleration sensor.

In one embodiment, the game map data storage further stores as a game map a plurality of kinds of lands of data, at least one of the plurality of kinds of lands being a land to have an effect upon a change amount in movement of the game character, and the program storage includes a program to move and display the game character in a manner which controls a change amount of movement thereof when the game character is present on the land, wherein the land has an effect upon the movement.

The game map data storage stores game map data having an area greater than a display area of the display, the game character data storage storing data to display a player character to be operated by the player, and the program storage displaying on the display one area of the game map near the player character, and including a game map movement display program to display the one area with scrolling in accordance with movement of the player character.

In the case that the game character data storage further stores non-player character data to display at least one of non-player characters not to be moved by the player, the program storage further storing a program to move by self-control at least one of the non-player characters.

The program storage further includes an impact determination program to determine a presence of an impact input based on an output of the acceleration sensor in magnitude equal to or greater than a given value.

Specifically, the acceleration sensor includes an acceleration detecting section to detect respective accelerations in first and second directions perpendicular to each other to thereby output a first output value dependent upon an acceleration in the first direction and a second output value dependent upon an acceleration in the second direction, and the impact determination program determines a presence of an impact input when a resultant vector having a vector component in the first direction taken by the first output value and a vector component in the second direction taken by the second output value is equal to or greater than a given value.

Movement of the game character is displayed with a greater moving amount than that of a movement of display based on a program when the impact determination program determines a presence of an impact input. Alternatively, the game character is displayed with an inverted position when the impact determination program determines a presence of an impact input.

In the case that the game character is displayed in a manner of moving over and along the background image, the program storage simulating a tilt of the background image depending upon a tilt of the portable game apparatus to display the game character in a manner of moving over and along the background image depending upon a tilt direction of the background image.

In a still another aspect of the invention, there is provided an information storage medium to be used on a portable game apparatus including a display to display game scenes, a housing to be gripped by a hand of a player and arranged with the display in one main surface thereof, and a processor, including: a game map data storage for storing game map data to display on the display a game map as a background image; a game character data storage for storing game character data to display on the display a game character; an acceleration sensor for detecting a change amount depending upon a movement or tilt of the portable game apparatus due to detection of an acceleration; and a program storage for storing program data to move and display the game character depending upon at least a tilt direction detected by the acceleration sensor, wherein the processor performs processing based on an output of the acceleration sensor and the program thereby controlling a game image displayed on the display such that a display state of the game character is varied depending upon an acceleration.

In one embodiment, the acceleration sensor detects an acceleration due to an abrupt movement of the portable game apparatus and detects at least one of a tilt amount and a tilt direction due to a moderate tilt thereof, and the program storage including a program to move and display the game character in a manner which changes a moving amount based on a tilt amount as a detection output of the acceleration sensor.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 16 is an illustrative view showing a method of utilizing the slide input;

FIG. 19 is an illustrative view showing a method of utilizing an impact input;

FIG. 20 is an illustrative view showing a method of utilizing an acceleration input in the Y-axis direction;

FIG. 25 is an illustrative view showing an acceleration sensor output conversion table (for recommended position setting);

FIG. 26 is an illustrative view showing an acceleration sensor output conversion table (for game map selection);

FIG. 27 is an illustrative view showing an acceleration sensor output conversion table (for player character movement/in-air);

FIG. 28 is an illustrative view showing an acceleration sensor output conversion table (for player character movement/on-floor);

FIG. 29 is an illustrative view showing an acceleration sensor output conversion table (for player character movement/on-ice);

FIG. 30 is an illustrative view showing an acceleration sensor output conversion table (for player character movement/under-water);

FIG. 31 is an acceleration sensor output conversion table (for NPC movement/in normal position);

FIG. 32 is an illustrative view showing an acceleration sensor output conversion table (for NPC movement/in upside-down position);

DETAILED DESCRIPTION OF THE PREFERRED EMBODIMENTS

Figure 1:
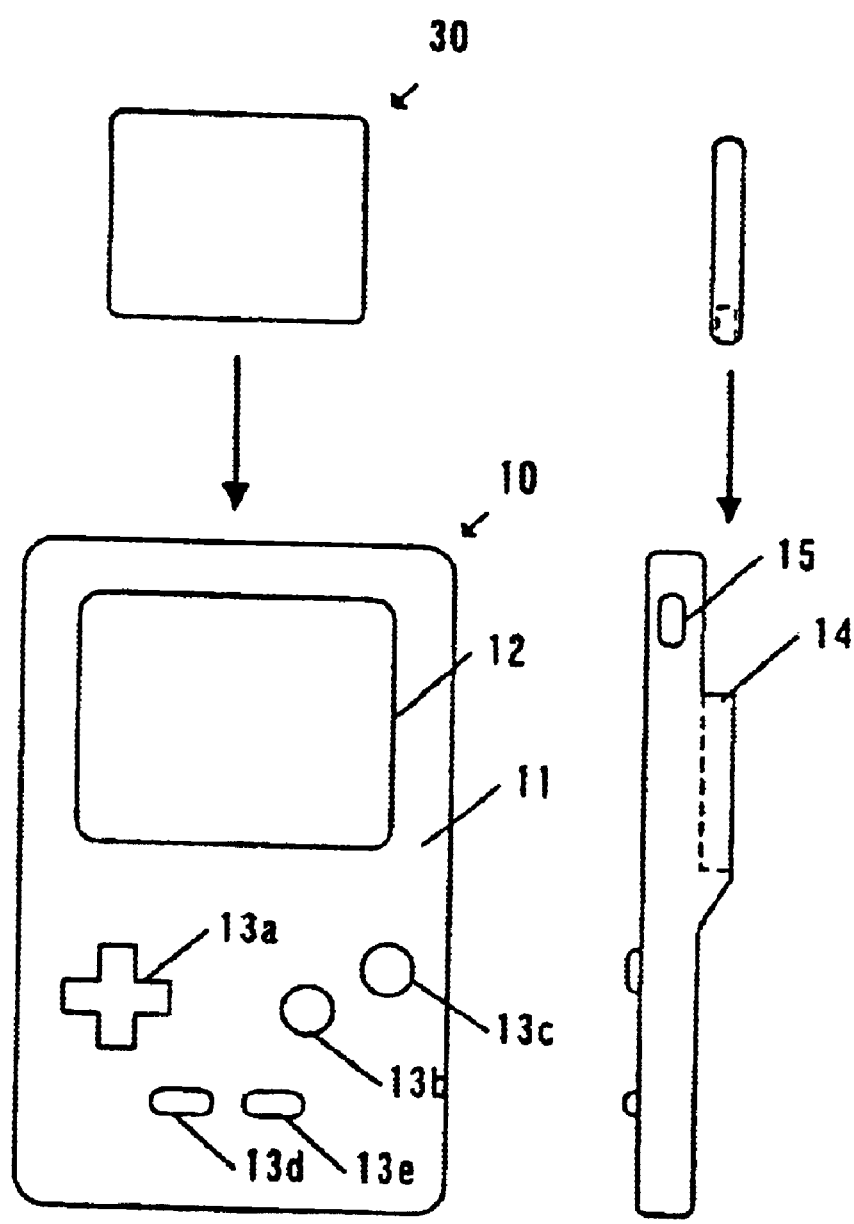
FIG. 1 is an outside view showing a portable game apparatus according to one embodiment of the present invention.

FIG. 1 is an outside view showing a portable game apparatus according to an embodiment of the present invention. The portable game apparatus includes a game machine main body 10 and a game cartridge (hereinafter referred merely to as "cartridge") 30 to be unloadably loaded on the game machine main body 10. The cartridge 30, when loaded on the game machine main body 10, is put in electrical connection to the game machine main body.

Figure 3:
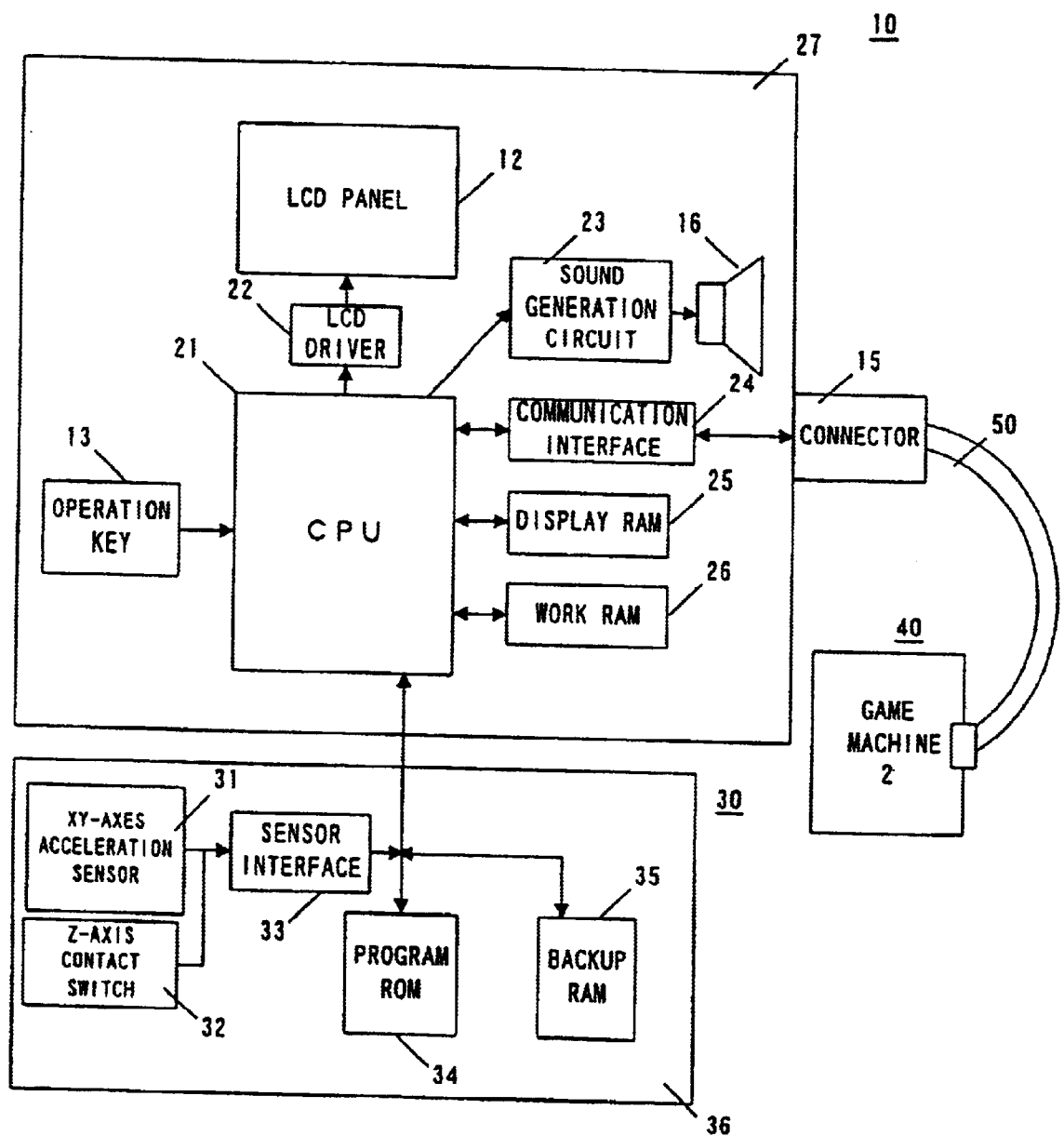
FIG. 3 is a block diagram showing the portable game apparatus of one embodiment.

The game machine main body 10 is provided with a housing 11. The housing 11 includes therein a board having circuits configured as shown in FIG. 3, and described below. The housing 11 has, on one main surface, an LCD 12 and operation keys 13a–13e and, on the other surface, a hole (cartridge insertion hole) 14 formed to receive a cartridge 30. A connector 15 is provided on a side surface, to allow connection with a communication cable for communication, as desired, with other portable game apparatuses.

Figure 2:
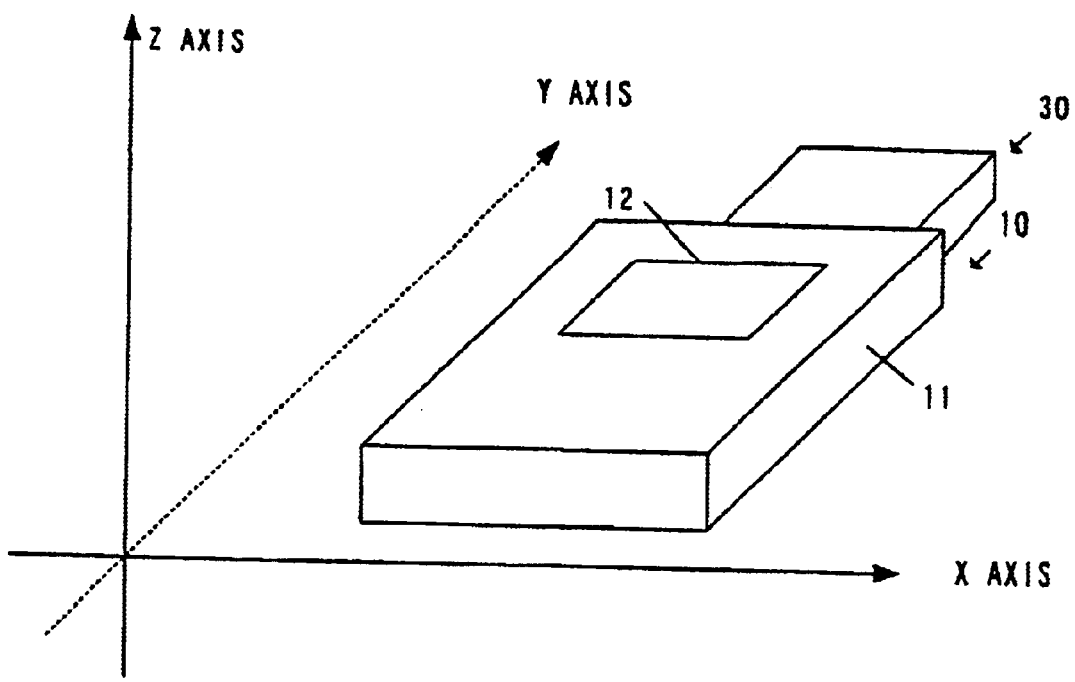
FIG. 2 is an illustrative view to show a definition of XYZ axes.

FIG. 2 is an illustrative view showing a relationship between the portable game apparatus and XYZ axes thereon. In one state, the portable game apparatus is positioned with the LCD 12 directed up and the operation key 13 (FIG. 1) having a corresponding position. An X-axis is taken in a horizontal direction of the portable game apparatus (a plus direction taken rightward), a Y-axis is in a vertical direction (a plus direction taken depthwise), and a Z-axis is in a thickness direction (a plus direction taken upward).

FIG. 3 is a block diagram of the portable game apparatus. The game machine main body 10 incorporates a board 27 therein. The board 27 is mounted with a CPU 21. The CPU 21 is connected with an LCD driver 22, an operation key 13, a sound generator circuit 23, a communication interface 24, a display RAM 156 and a work RAM 26. The sound generator circuit 23 is connected with a speaker 16. The communication interface 24 is to be connected to another portable game apparatus 40 through a connector 15 and communication cable 50. Note that, although the communication method with the other portable game apparatus 40 was shown by a method using the communication cable 50, it may use radio communication, cell phone or the like.

The cartridge 30 incorporates a board 36. The board 36 is mounted with a program ROM 34 storing a game program and game data, hereinafter described with reference to FIG. 21, and a backup RAM 35 storing a game data, hereinafter described with reference to FIG. 24. In addition to these storage devices, the cartridge 30 includes, as one example of an acceleration detector, an XY-axes acceleration sensor 31 to detect accelerations in X-axis and Y-axis directions and a Z-axis contact switch 32 to detect an acceleration in a Z-axis direction. Also, the cartridge 30 includes a sensor interface 33 as an interface to the acceleration detector. In another embodiment, a triaxial acceleration sensor capable of detecting accelerations in all the X-axis, Y-axis and Z-axis directions may be used, thereby eliminating the Z-axis contact switch 32. Incidentally, the biaxial acceleration sensor (XY-axes acceleration sensor) is less expensive than the triaxial sensor. Because the preferred embodiment does not require high accuracy of acceleration detection in the Z-axis direction, a Z-axis contact switch 32 is employed that is simple in structure and cheap in price.

The program ROM 34 is stored with a game program to be executed by a CPU 21. The work RAM 26 is stored with temporary data required to execute the game program. The backup RAM 35 is to store game data to be maintained even when power to the portable game apparatus is turned off. The display data obtained through executing the game program by the CPU 21 is stored in the display RAM 25, which can be displayed on the LCD 12 through an LCD driver 22. Similarly, the sound data obtained through executing the game program by the CPU 21 is delivered to the sound generator circuit 23 so that game music or sound effects are generated through the speaker 16. A player can operate the operation key 13 to give an input. However, the operation key 13 is an auxiliary one as far as the present embodiment is concerned. Input is made principally by tilting or moving the portable game apparatus, or game machine main body 10. The input by tilting or moving the portable game apparatus can be detected by the XY-axes acceleration sensor (hereinafter merely referred to as "acceleration sensor") 31 and the Z-axis contact switch (hereinafter merely referred to as "contact switch") 32. The CPU 21 can execute the game program by utilizing the output values of the acceleration detector.

For a game that uses a plurality of portable game apparatuses, the game data obtained through executing a game program by the CPU 21 is delivered to the communication interface 24 and then sent to another portable game apparatus 40 via the connector 15 and communication cable 50. Meanwhile the game data of the other portable game apparatus 40 comes to the CPU 21 through the communication cable 50, connector 15 and communication interface 24.

Figure 4:
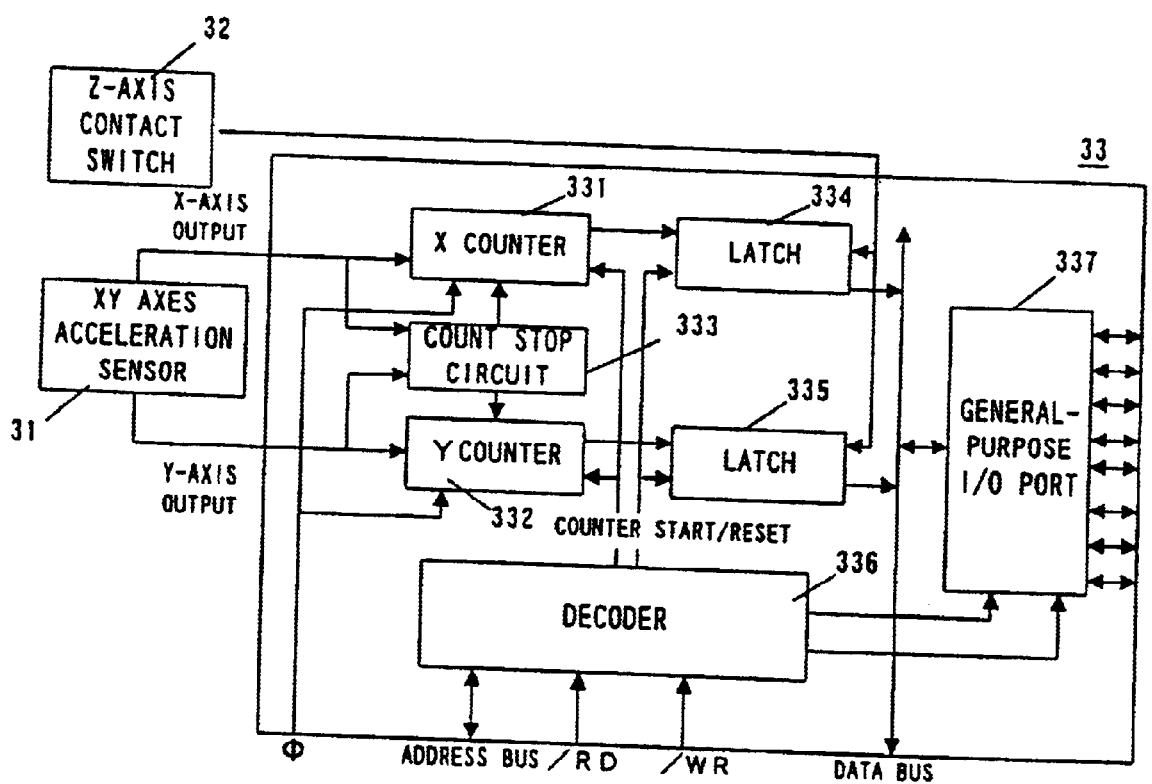
FIG. 4 is a block diagram showing a sensor interface.

FIG. 4 is a detailed block diagram of the sensor interface 33. The sensor interface 33 includes an X counter 331, a Y counter 332, a count stop circuit 33, latches 334 and 335, a decoder 336 and a general-purpose I/O port 337. The X counter 331 counts pulses of a clock signal Φ based on an X-axis output of the acceleration sensor 31. The Y counter 332 counts pulses of the clock signal Φ based on a Y-axis output. The count stop circuit 333 sends a count stop signal to the X counter 331 in response to a fall in an X-axis output of the acceleration sensor 31, and a count stop signal to the Y counter 332 in response to a fall in the Y-axis output. The latches 334 and 335 hold respective values of the X counter 331 and the Y counter 332. The decoder 336 transmits a start/reset signal to the X counter 331, Y counter 332, latches 334 and 335. The general-purpose I/O port 337 is used to connect with an extension unit. The latches 334 and 335 also hold an output value of the contact switch 32 ("0" or "1"). Specifically, a highest order bit of the latch 334, 335 is assigned to an output value of the contact switch 32, while the remaining lower order bits are assigned to the values of the X counter and Y counter. The extension units connectable to the general-purpose I/O port 337 include a vibration unit which vibrates in relation to a game program providing a game with a feeling of increased realism.

Figure 5:
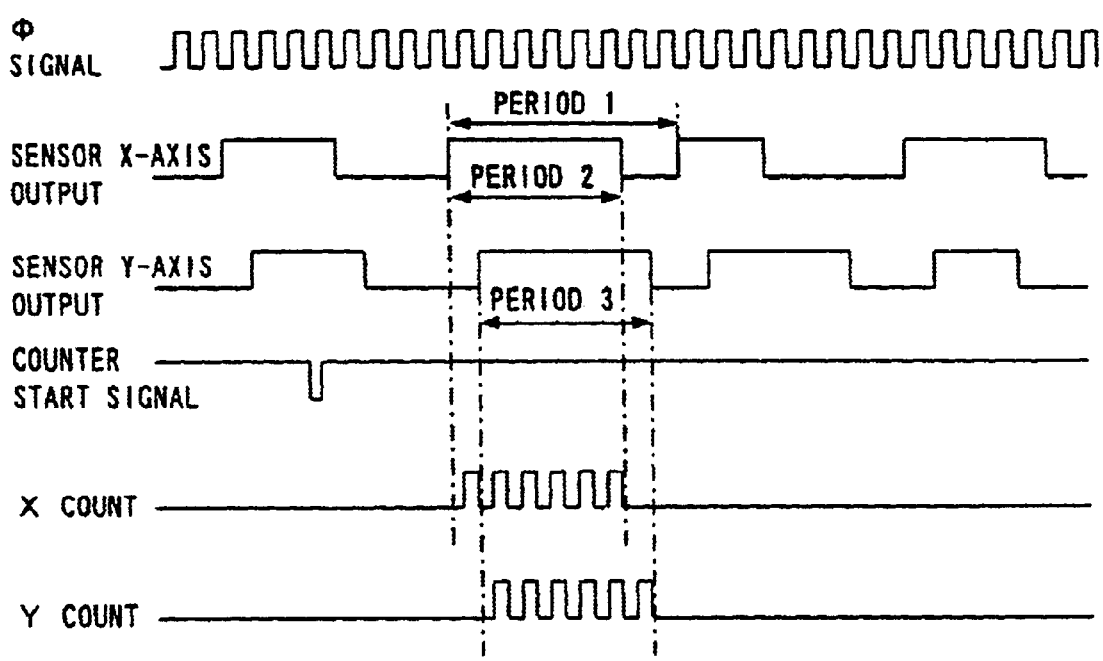
FIG. 5 is an illustrative view showing a principle of measuring an output of an acceleration sensor.

FIG. 5 is an illustrative view showing how the sensor interface 33 measures a count value having a corresponding magnitude to an acceleration from an output of the acceleration sensor 31. The acceleration sensor 31 in this embodiment outputs a signal representative of an acceleration magnitude with a duty ratio changed with respect to one period of a waveform (period 1). It is shown in this case that the greater the ratio of a high level period (period 2 or period 3) within one period the greater an acceleration that will be detected. Also, the acceleration sensor 31 outputs a magnitude of X-axis acceleration through its X-axis output and a magnitude of Y-axis acceleration through the Y-axis output.

When a count start signal outputted from the decoder 336 goes to a low level, the X counter 331 detects a rise from low to high level in the X-axis output and then starts counting. Specifically, the X counter 331 inches up its count value each time a clock signal Φ is given, and stops the counting in response to a count stop signal sent from the count stop circuit 333. In this manner, the X counter 331 counts on the clock signal Φ during a period (period 2) between a rise of an X-axis output to a high level and a fall of same to a low level, immediately after the count start signal has become a low level. The Y counter 332, similarly, counts on the clock signal Φ during a period (period 3) between a rise of the Y-axis output to a high level and a fall of same to a low level, immediately after the count start signal has gone to a low level. In this manner, the X counter 331 holds a count value dependent upon a magnitude of an X-axial acceleration while the Y counter 332 holds a count value dependent upon a magnitude of a Y-axial acceleration. The values of the X counter 331 and Y counter 332 are held in the latch 334 and latch 335 so that the data of latches 334 and 335 can be read out by the CPU 21 through the data bus and utilized for a game program.

The X counter 331 and the Y counter 332 each perform counting, for example, from "0" up to "31", wherein setting is made such that, a count value "15" is considered a reference (acceleration 0), -2G (twice a gravity acceleration in a minus direction) is assigned by a count value "0" and 2G (twice the gravity acceleration in a plus direction) is by a count value "31". The CPU 21 reads in such a count value based on a game program wherein the count value "15" is read as "0", the count value "0" as "-15" and the count value "31" as "16". Accordingly, when the acceleration sensor 31 detects an acceleration in the minus direction, the CPU has a minus (-) reading value. When an acceleration in the plus direction is detected, the CPU has a plus (+) reading value.

Figure 6:
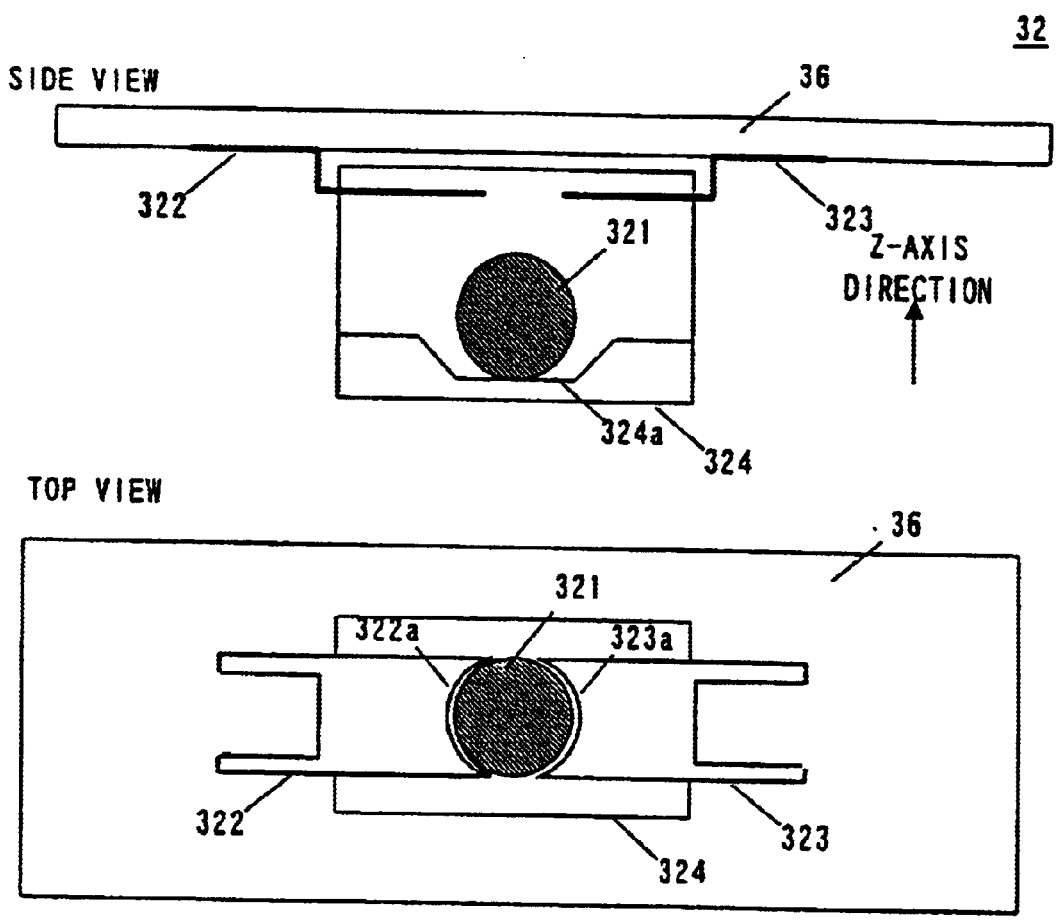
FIG. 6 is an illustrative view showing a structure of a Z-axis contact switch.

FIG. 6 shows the structure of the contact switch 32. The contact switch 32 is structured by a spherical contact 321, contacts 322 and 323, and a box member 324 which are formed of a conductor. Specifically, the spherical contact 321 is movably held almost at a center of a space defined within the member 324. For this reason, the box member 324 has, in its inner bottom, a depression 324a at which the spherical contact 321 can rest at almost the center. The top of the box member 324 has sheet-formed contacts 322 and 323 having respective ends formed with semicircular cutouts 322a and 323a. The sheet contacts 322 and 323, at their other ends, are secured to a board 36 with the ends opposed to each other. The box member 324 is fixedly held by the board 36 in a hanging state through the contacts 322 and 323.

Figure 7:
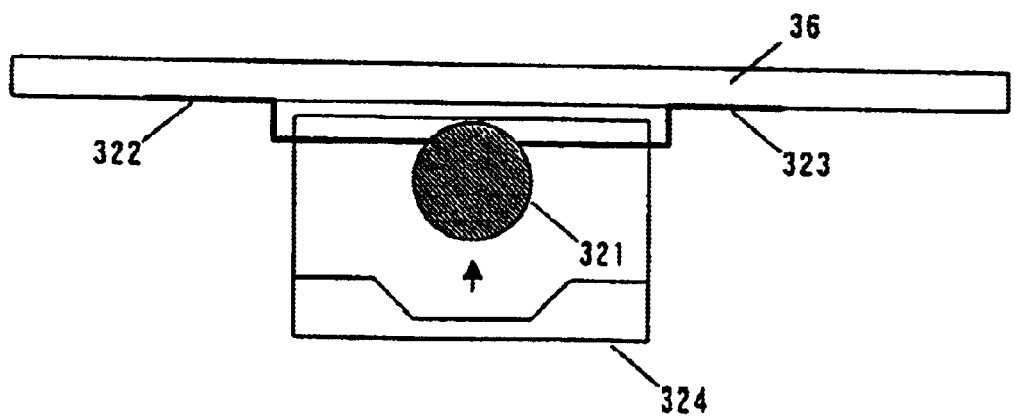
FIG. 7 is an illustrative view showing a case that the Z-axis contact switch detects an acceleration input in a Z-axis direction.

With this structure, if the cartridge 30 is powerfully moved in the Z-axis direction (in a plus or minus direction), the spherical contact 321 shown in FIG. 7 is moved in the Z-axis direction within the box member 324 and contacts the contacts 322 and 323 simultaneously. Thus, the contact 322 and the contact 323 are conducted through the spherical contact 321, thereby detecting an acceleration input in the Z-axis direction. Based on a time for which the contact 322 and the contact 323 are in conduction, it is possible to detect a magnitude of acceleration in the Z-axis direction. Note that, when the cartridge 30 is moderately tilted, the spherical contact 321 moves in the box member 324 but does not short-circuit the contacts 322 and 323, thereby not detecting acceleration.

Figure 8:
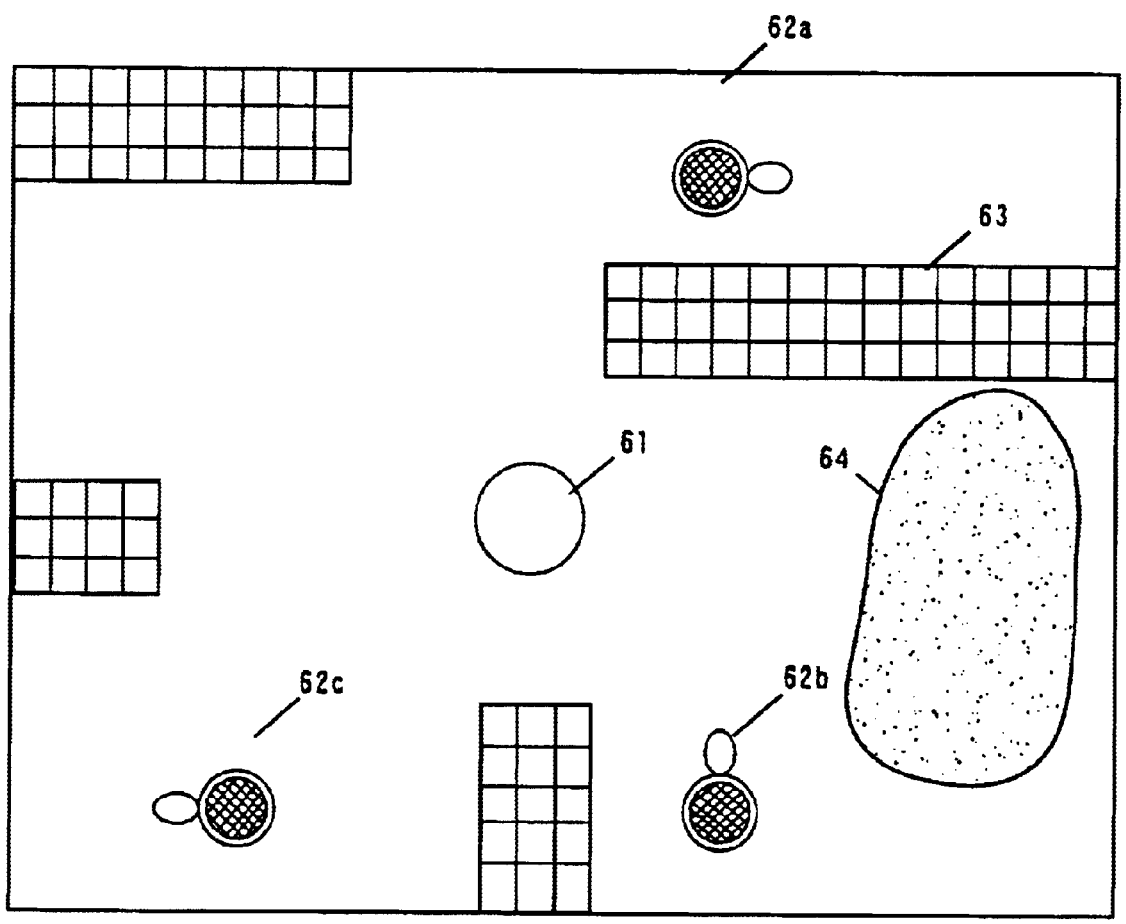
FIG. 8 is an illustrative view showing a game scene of the embodiment.

FIG. 8 shows an example of a game scene using the portable game apparatus having an acceleration sensor of the instant invention. In this game scene, there is displayed a ball 61 as one example of a player character, tortoises 62 as one example of an enemy character (non-player character; hereinafter abbreviated as "NPC"), and a wall 63 and hole 64 forming a maze. Because a game map is a virtual map that is broader than a display range on an LCD 12, LCD 12 can display only part of the game map so that scroll is preformed in accordance with the movement of the player character 61. Although three tortoises 62a–62c are displayed as NPC on the LCD 12, there exist many other tortoises in the game map. Also, land exists on the game map such as floors, ice surfaces, and underwater portions, where the player character, or ball, 61 is to move about.

The ball 61 is changed in its moving direction or range or its shape, if required, by player's operation, such as tilting of or applying an impact to the portable game apparatus. Specifically, movement control is conducted by tilting of, inputting an impact to or applying a Z-axis acceleration to the portable game apparatus, as hereinafter described with reference to FIG. 17 to FIG. 20. Although movement of the tortoise 62 is controlled (moved by self-control) by the game program, it can be moved or changed in shape when the portable game apparatus is tilted, inputted with an impact or applied with a Z-axis acceleration by the player.

In this game, a player can manipulate the ball 61 on the game map with a maze formed by the walls 63, and smashes the tortoises 62a –62c as an example of NPC. If a tortoise is smashed, it will vanish or be erased. If all the tortoises are successfully vanished out of the game map, a game clear state is reached. There exist some holes 64 on the game map. If the ball 61 falls into the hole 64, one mistake is counted or the game becomes over.

Figure 9:
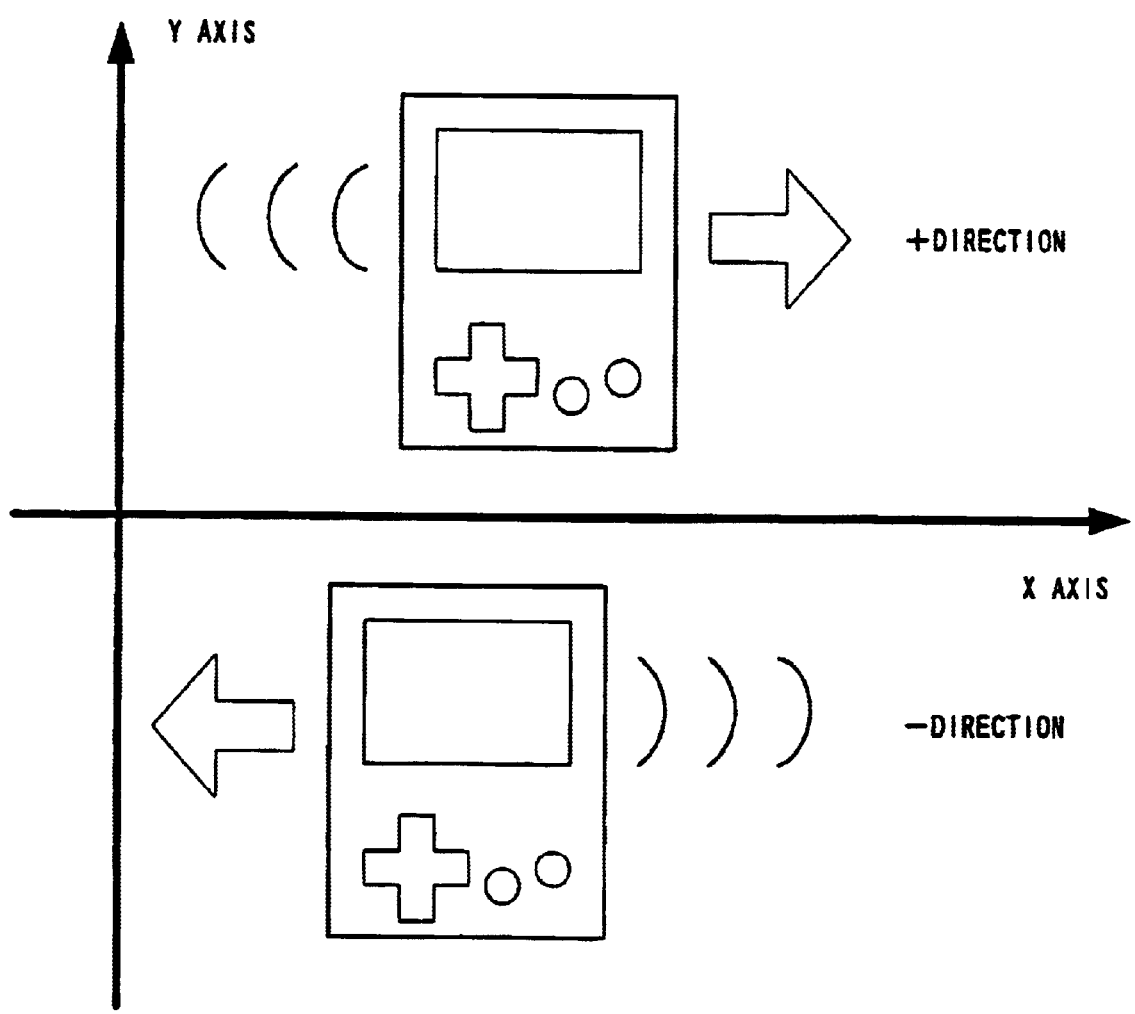
FIG. 9 is an illustrative view showing an X-axis slide input.
Figure 10:
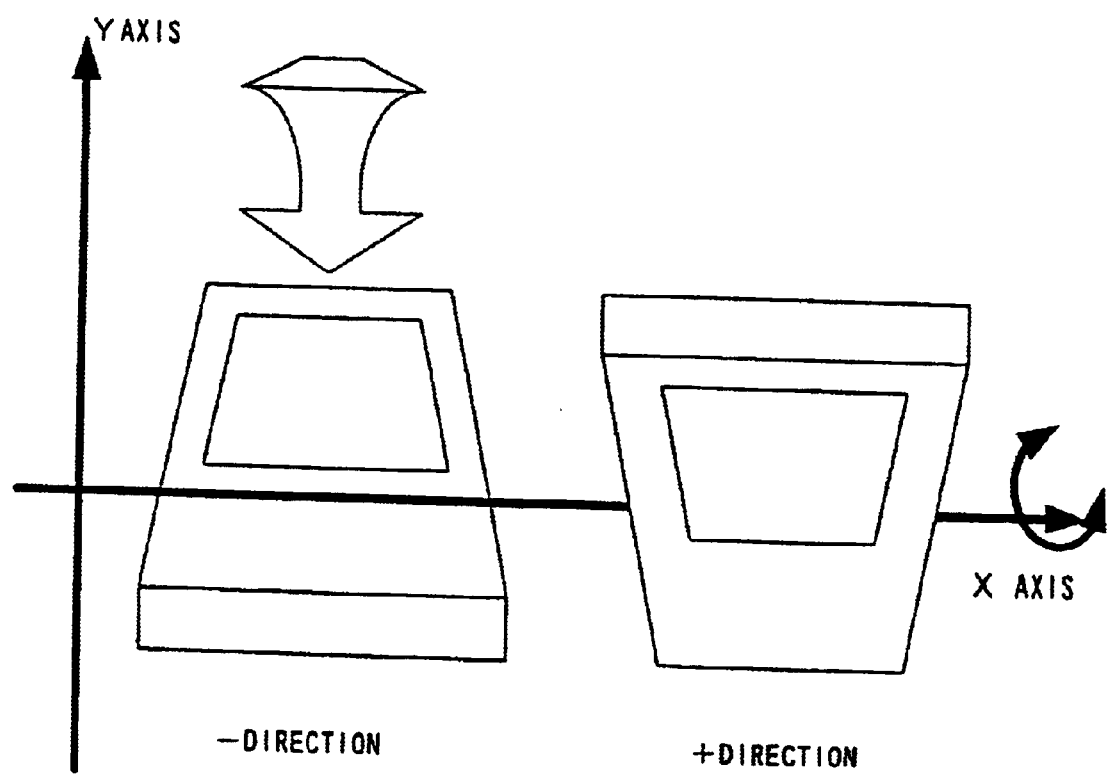
FIG. 10 is an illustrative view showing a tilt input about the X-axis.
Figure 11:
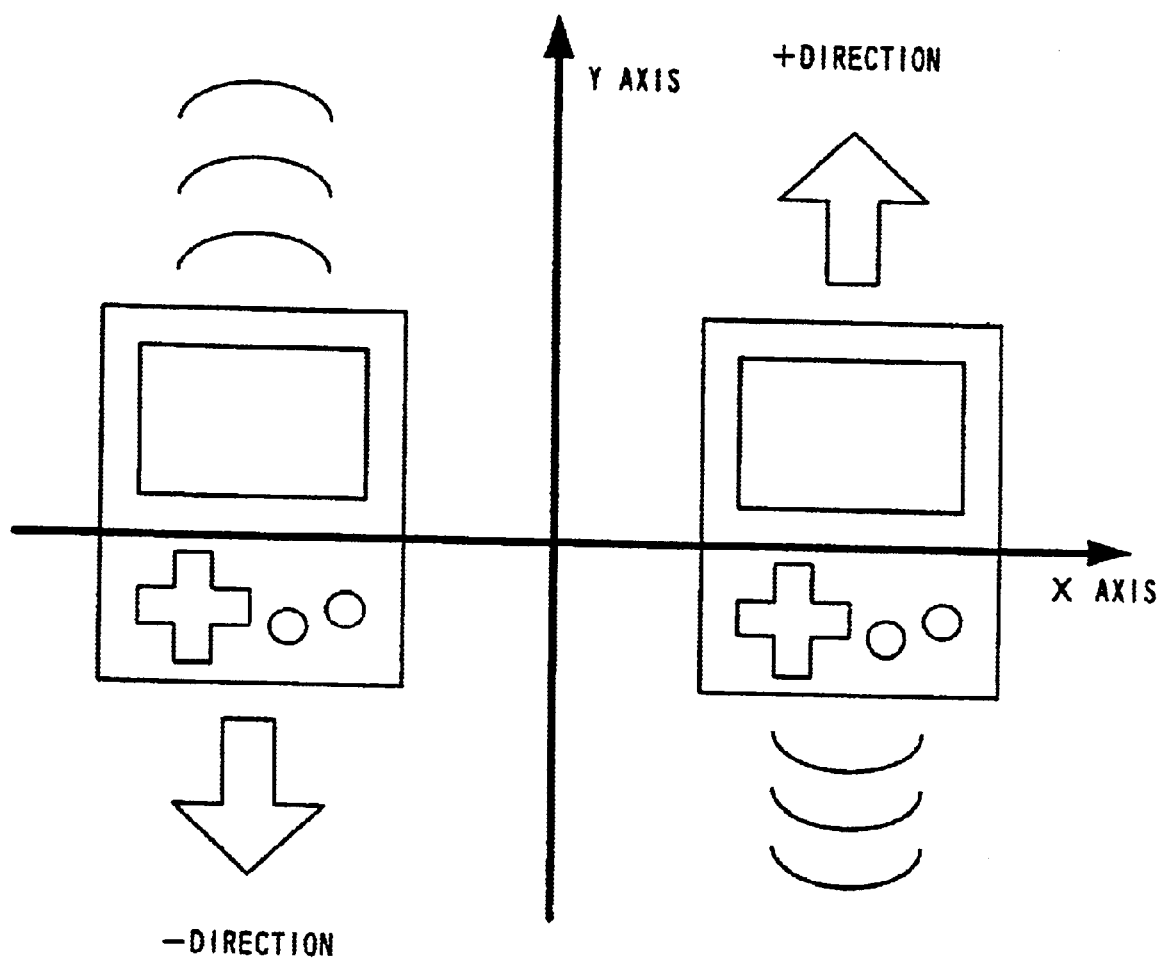
FIG. 11 is an illustrative view showing a Y-axis slide input.
Figure 12:
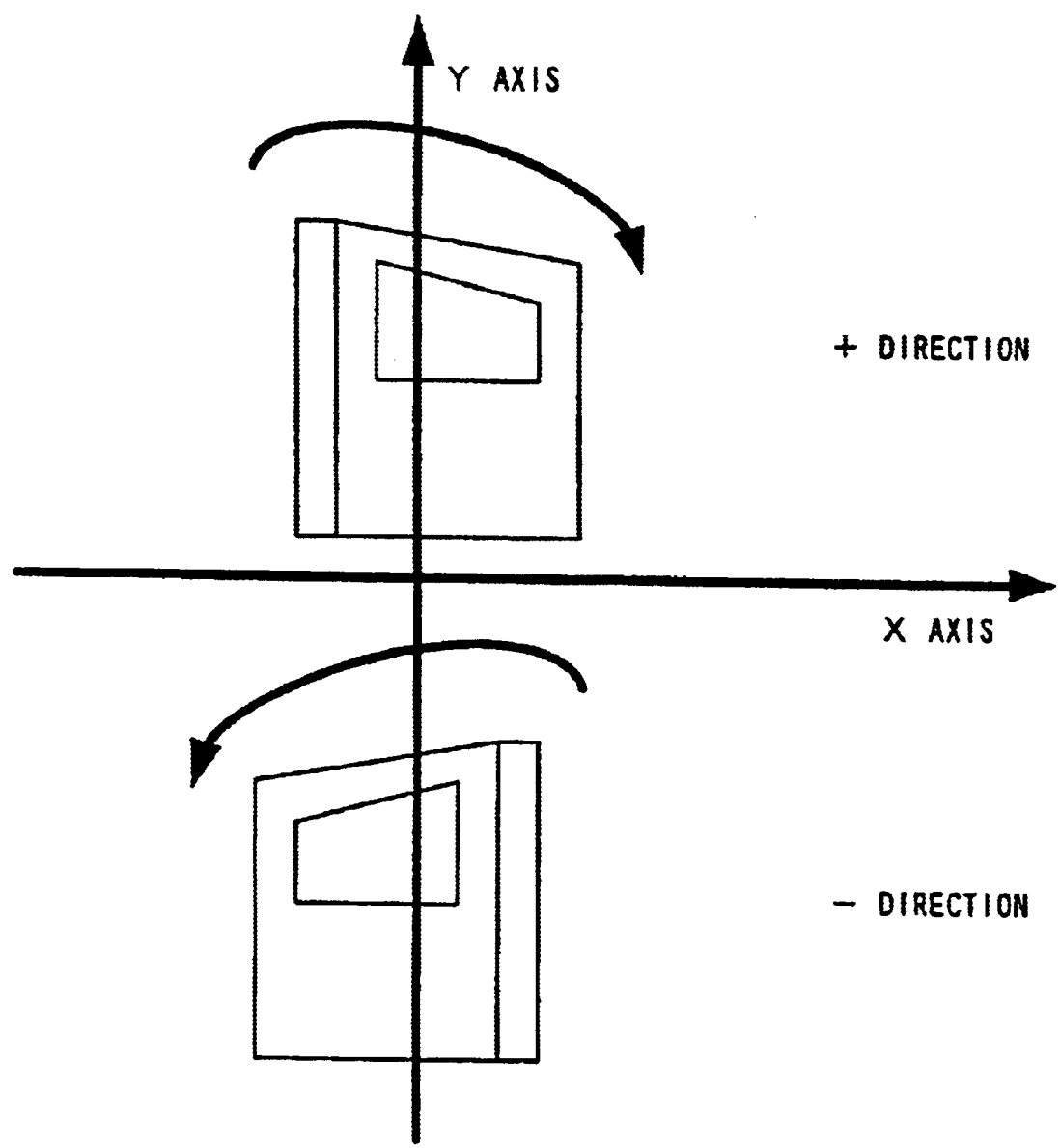
FIG. 12 is an illustrative view showing a tilt input about the Y-axis.
Figure 13:
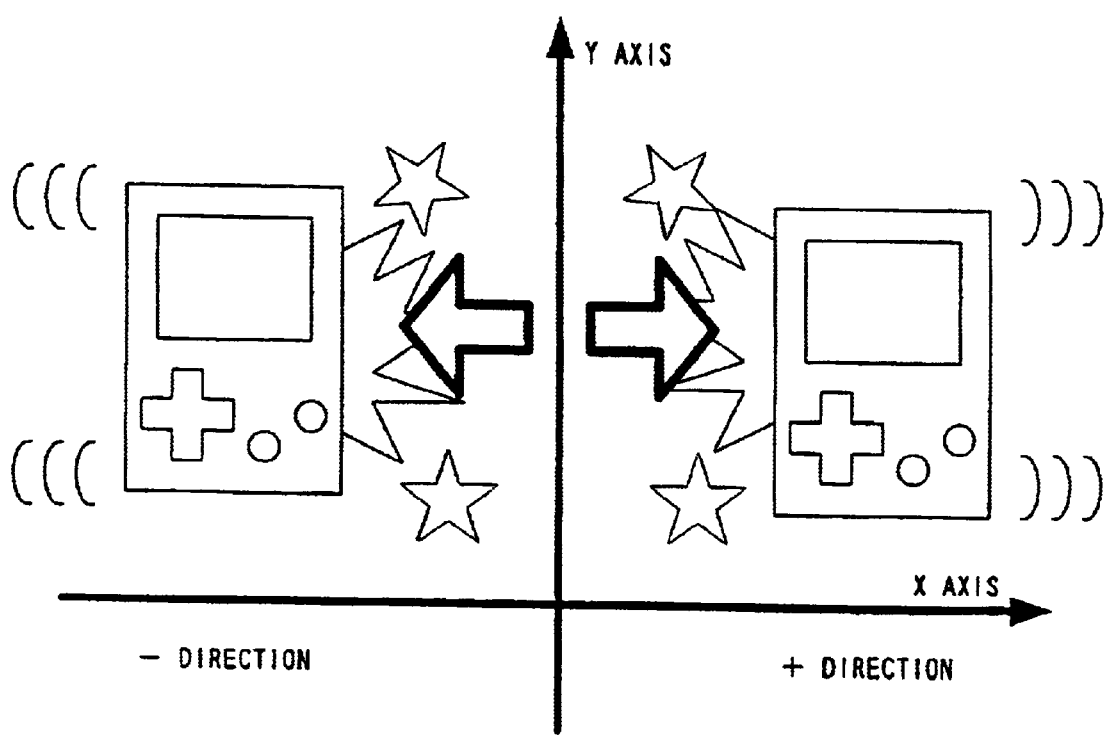
FIG. 13 is an illustrative view showing an impact input in the X-axis direction.
Figure 14:
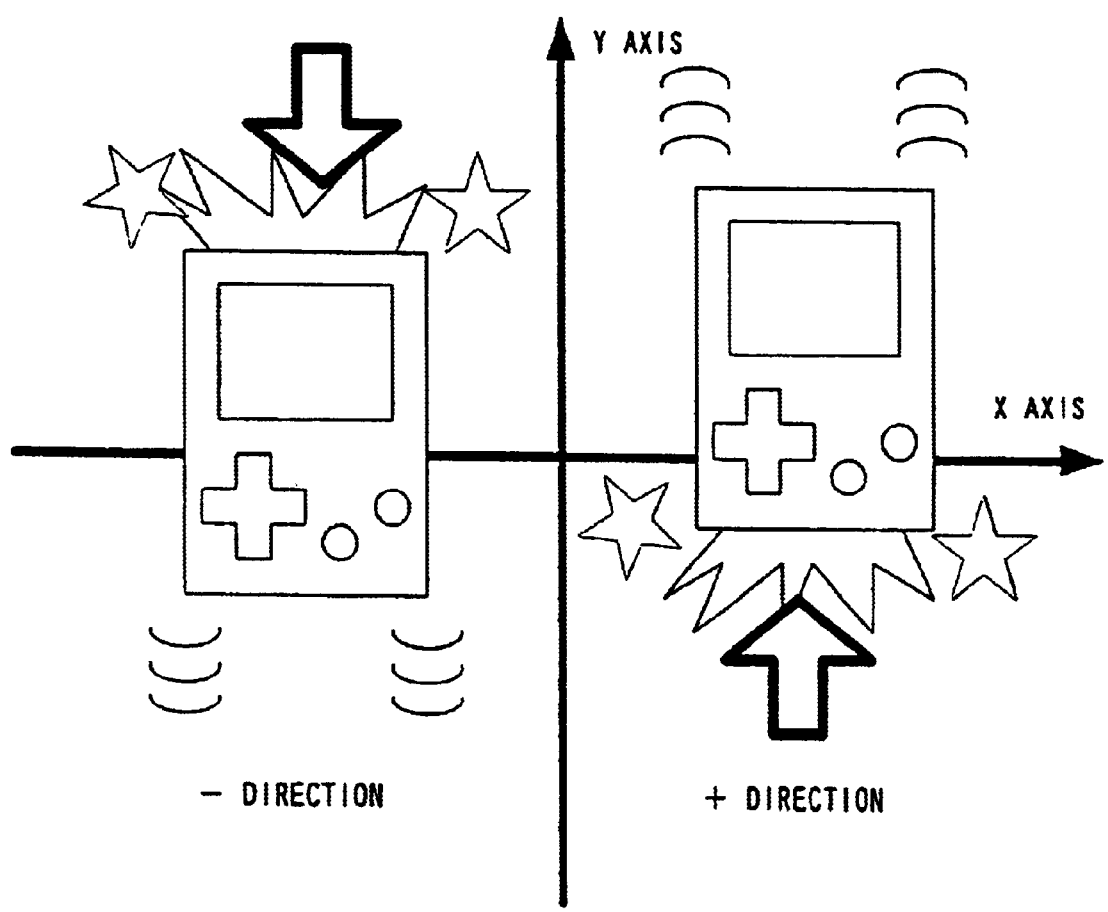
FIG. 14 is an illustrative view showing an impact input in the Y-axis direction.
Figure 15:
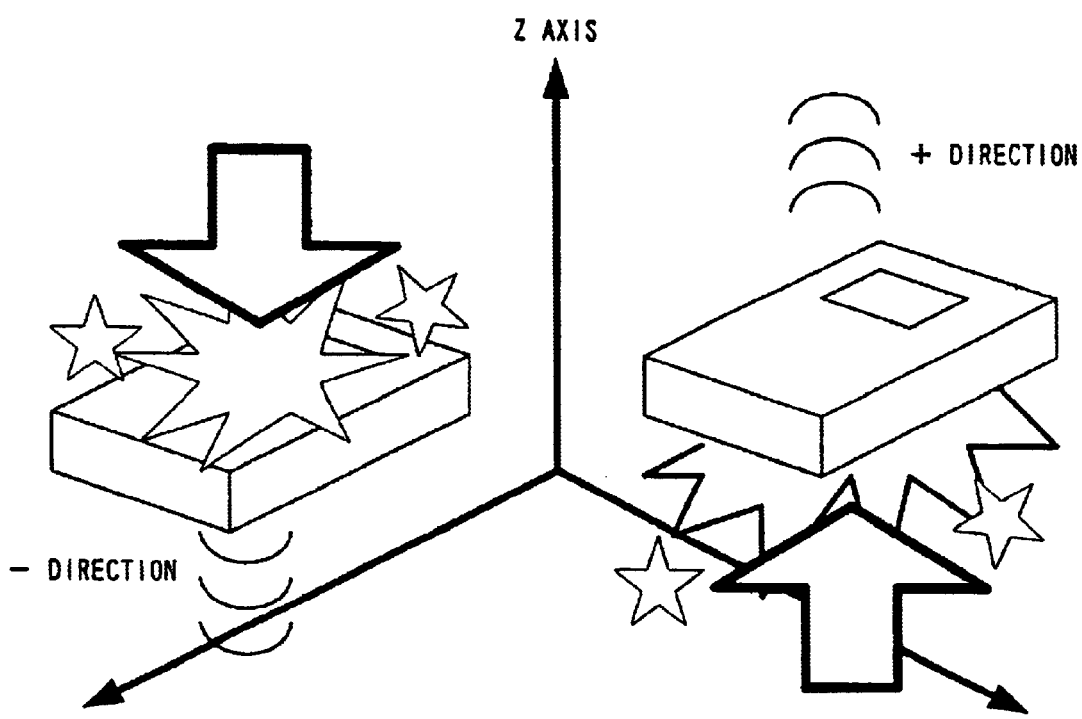
FIG. 15 is an illustrative view showing an acceleration input in the Y-axis direction.

FIG. 9 to FIG. 15 are illustrative views showing an example of a method of operating the portable game machine with utilizing the acceleration sensor 31 and contact switch 32. If the portable game apparatus is slid in an X-axis positive or negative direction as shown in FIG. 9, a signal having a pulse width proportional to a moving acceleration in the X-axis direction is taken from the X-axis output of the acceleration sensor 31. If the portable game apparatus is turned or tilted about the X-axis as shown in FIG. 10, a signal having a pulse width proportional to a tilt angle about the X-axis is taken from the Y-axis output of the acceleration sensor 31. If the portable game apparatus is slid in a Y-axis positive or negative direction as shown in FIG. 11, a signal having a pulse width proportional to a moving acceleration in the Y-axis direction is taken from the Y-axis output of the acceleration sensor 31. If the game machine main body is turned or tilted about the Y-axis as shown in FIG. 12, a signal having a pulse width proportional to a tilt angle about the Y-axis is taken from the X-axis output of the acceleration sensor 31. If the player taps the portable game apparatus in its right or left side face (or abruptly move it right or left) by his or her hand as shown in FIG. 13, a signal having a corresponding pulse width to a magnitude of the impact input is outputted through the X-axis output of the acceleration sensor 31. If the player taps the portable game apparatus in its top or bottom surface (or abruptly moves it up or down) by his or her hand as shown in FIG. 14, a signal having a proportional pulse width to a magnitude of the impact input is outputted through the Y-axis output of the acceleration sensor 31. If the player abruptly moves the portable game apparatus in the Z-axis direction (in a direction perpendicular to a flat surface) as shown in FIG. 15, an acceleration in the Z-axis direction is detected by the contact switch 32.

FIG. 16 to FIG. 20 show examples of ways to utilize for a game the detection of an input as explained above. FIG. 16 is an example of utilization wherein the portable game apparatus is slid in the X-axis direction (also an example of a game scene of a game map select process, hereinafter described with reference to FIG. 38). Where the LCD 12 displays part of a virtual map that is greater than a display range of the LCD 12, if the portable game apparatus is slid in the X-axis direction to a such an extent that an acceleration can be detected by the acceleration sensor 31, then the region being displayed is scrolled. The sliding in the Y-axis direction is similarly processed. If there is an input due to sliding, such processing provides the player with a feeling as if he or she was viewing part of a broad world through the LCD 12.

Figure 17:
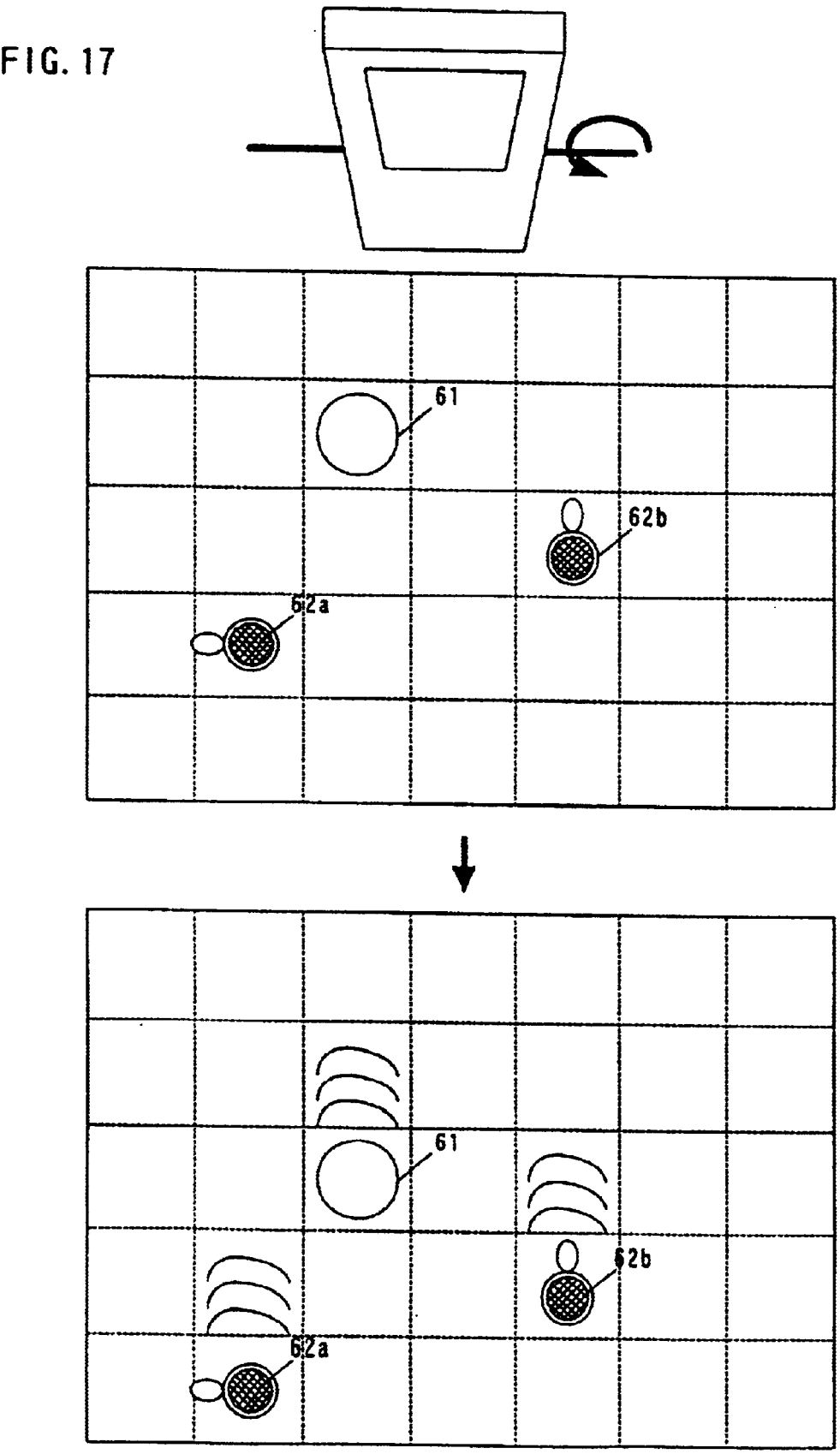
FIG. 17 is an illustrative view showing a method of utilizing a tilt input about the X-axis.
Figure 18:
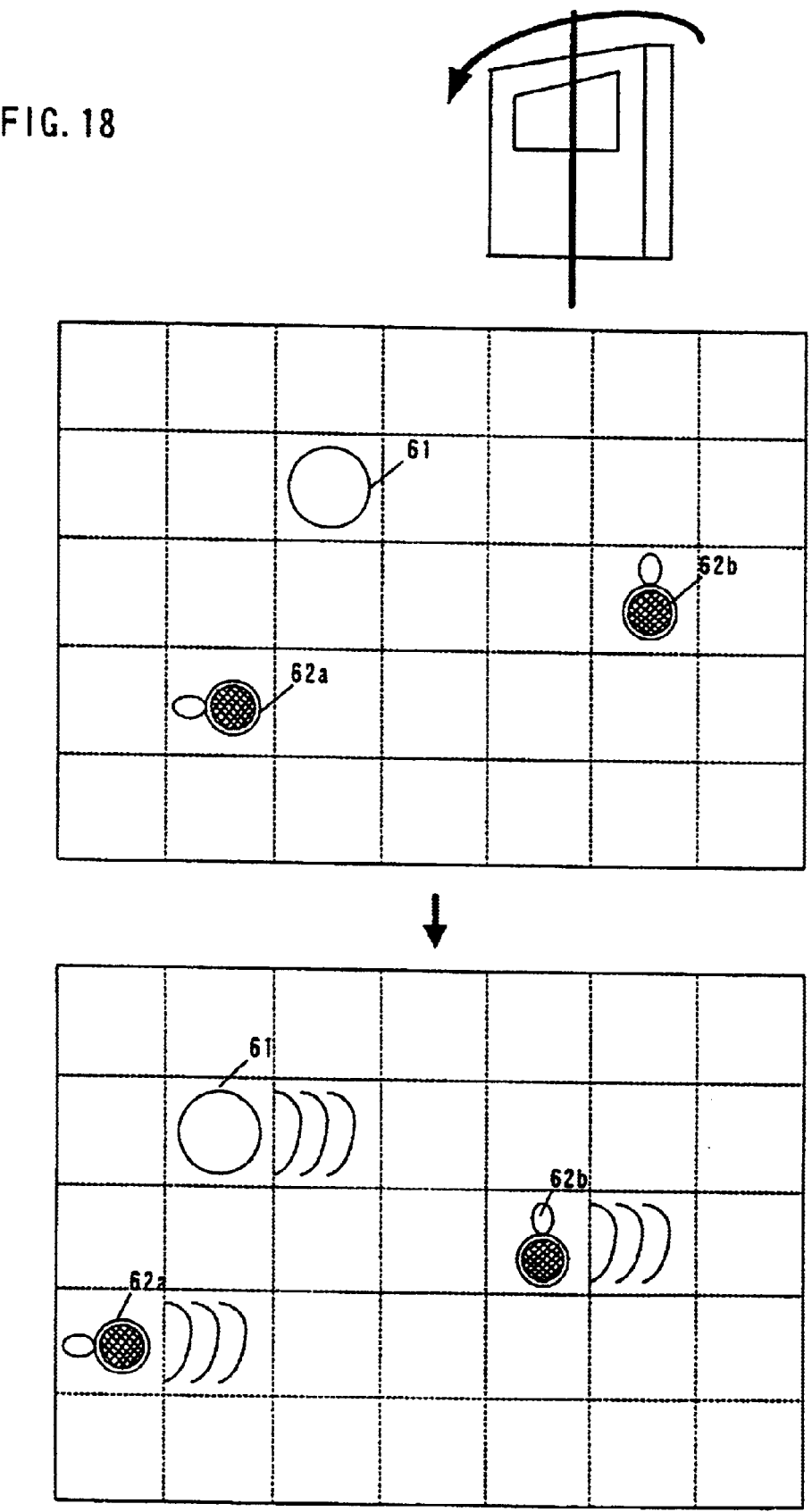
FIG. 18 is an illustrative view showing a method of utilizing a tilt input about the Y-axis.

When there is an input of tilt about the X-axis, display is made as shown in FIG. 17 such that the characters (player character and NPC) on the game scene are moved parallel with the Y-axis. If there is an input of tilt about the Y-axis, display is made as shown in FIG. 18 such that the characters (player character and NPC) on the game scene are moved parallel with the X-axis direction. When there is a tilt input, such processing provides such image display causing a feeling that the characters are sliding (or rolling) over a display plane responsive to a tilt of the portable game apparatus. Incidentally, the game map includes land regions, such as floor surface, ice surface and underwater portions, providing factors to vary a state of the ball 61 in movement, so that an amount of movement is varied by a tilt input in a manner dependent upon a place where the game character is present. For example, the ball 61 is changed in movement in such a way that the movement amount is great on an ice surface easy to slide whereas the movement amount is small when underwater.

When an impact input is applied in the X-axis or Y-axis direction, a different process is performed from the tilt input process (character movement) as shown in FIG. 19. For example, where the environment the character exists is on a water surface, it is possible to provide such display so as to cause waves in the water surface. When an impact input is applied in the X-axis plus direction, display is made such that waves are caused in the X-axis plus direction. When an impact input is applied in an X-axis minus direction, display is made to cause waves in the X-axis minus direction. This is true for an impact input in a Y-axis direction. Meanwhile, display may be made to cause waves in a direction of a resultant vector of vector components, wherein an acceleration input in the X-axis direction is taken a vector component in the X-axis direction while an acceleration input in the Y-axis direction is a vector component in the Y-axis direction. The character is displayed as if it was carried away by the waves. The character may be put out of control while it is being carried by the waves.

When the portable game apparatus is subjected to an impact in the Z-axis direction, it is determined that there was an acceleration input in the Z-axis direction. The ball 61 as one example of a player character is varied to make a jump (or float up), as shown in FIG. 20. During the jump, the ball 61 will not move even if there is a tilt input. Also, when there is an acceleration input in the Z-axis direction, the tortoise 62 as an example of an NPC is turned upside down (a tortoise upside down returns to the normal position). The tortoise in an upside-down position is easy to slide, so that the movement process is made to give a greater tilt-input moving amount than that of the normal position.

Figure 21:
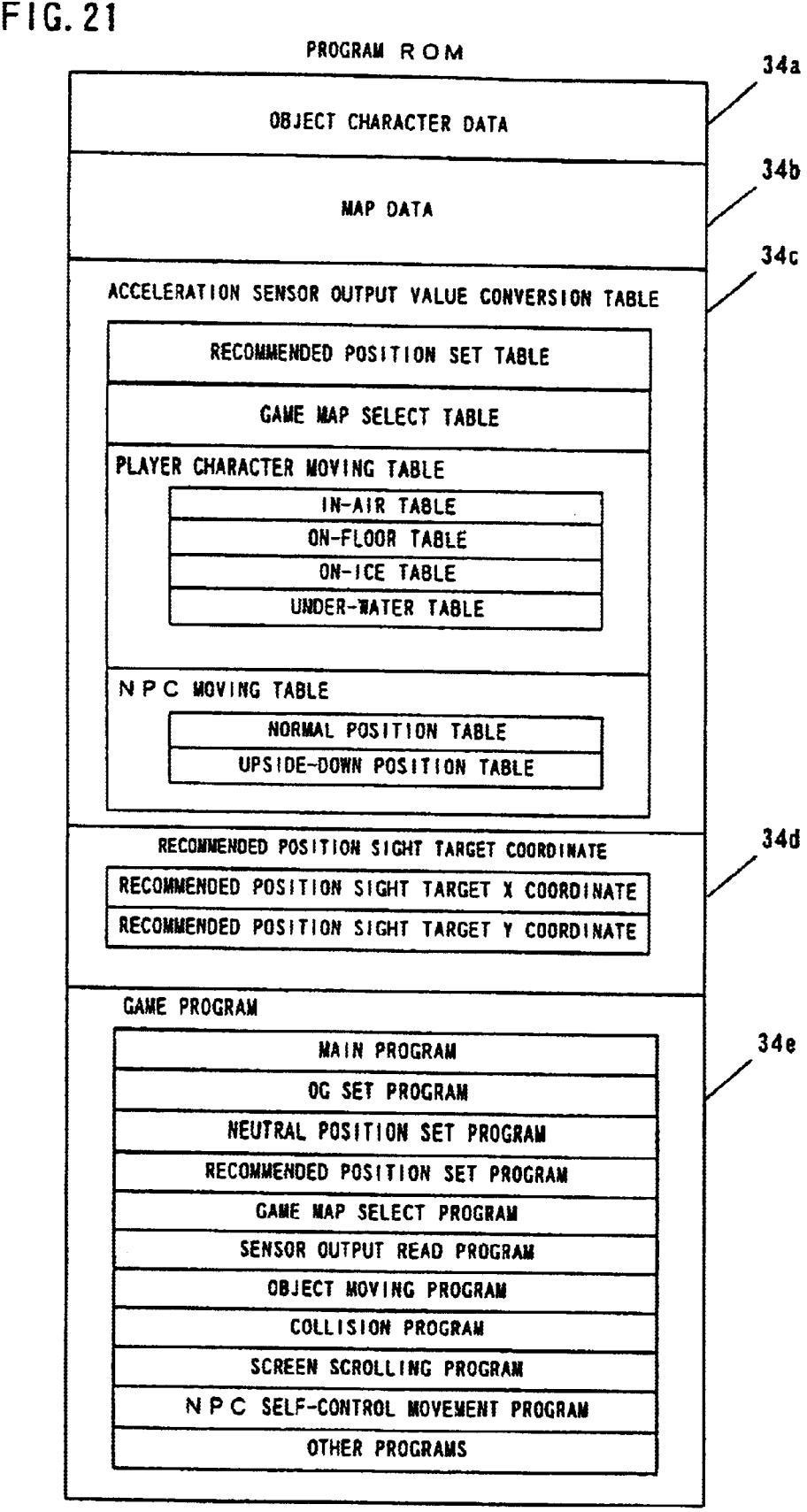
FIG. 21 is an illustrative view showing a memory map of a program ROM.

FIG. 21 is a memory map of the program ROM 34. The program ROM (hereinafter referred to as "ROM") 34 stores a game program and game data to be executed by the CPU 21. The ROM 34 includes a plurality of memory areas 34a–34e, specifically, an object character data memory area 34a, a map data memory area 34b, an acceleration sensor 31 and contact switch 32 output value conversion table memory area 34c, a recommended position sight target coordinate memory area 34d and a game program memory area 34e.

The memory area 34a stores graphic data of the object characters. Because the object character has some poses (e.g. tortoise "normal position" and "upside-down position", etc.), for each character a plurality of sets of graphic data are stored for a plurality of poses.

The memory area 34b stores map data on a game map basis and game-map-select maps. The game-map select map is virtual map data to be displayed on the LCD 12 during a game map select process hereinafter described with reference to FIG. 38.

The memory area 34c stores conversion tables to convert output values of the acceleration sensor 31 and contact switch 32, for utilization in a game program. The conversion tables includes a recommended position set table, a game map select table, a player character moving table and an NPC moving table. Also, the player character moving table includes various tables for in-air, on-floor, on-ice and underwater, which are to be selected depending upon a land coordinate where a player character is present. The NPC moving table includes tables for normal position and upside-down position. The tortoise assumes states of normal and backside-down positions, depending upon which a table is to be selected. The details of the tables will be hereinafter described with reference to FIG. 25 to FIG. 32.

The memory area 34d stores coordinate data of a sight target coordinate (at 71 in FIG. 36) to be displayed on the LCD 12 in a recommended position set process hereinafter described with reference to FIG. 36 to FIG. 37.

The memory area 34e stores various game programs to be executed by the CPU 21, e.g., a main program hereinafter described with reference to FIG. 33, a 0G set program hereinafter described with reference to FIG. 34, a neutral position set program hereinafter described with reference to FIG. 35, a recommended position set program hereinafter described with reference to FIG. 37, a game map select program hereinafter described with reference to FIG. 38, a sensor output read program hereinafter described with reference to FIG. 39, an object moving program hereinafter described with reference to FIG. 40 to FIG. 45, a collision program hereinafter described with reference to FIG. 46, a screen scroll program hereinafter described with reference to FIG. 49, an NPC self-controlled moving program and other programs. Here, the 0G set program is a program to memorize and set X-axis and Y-axis output values of the acceleration sensor 31 in a horizontal state of the portable game apparatus (i.e. a state that the acceleration sensor 31 is being vertically applied by a gravity =0G).

Figure 22:
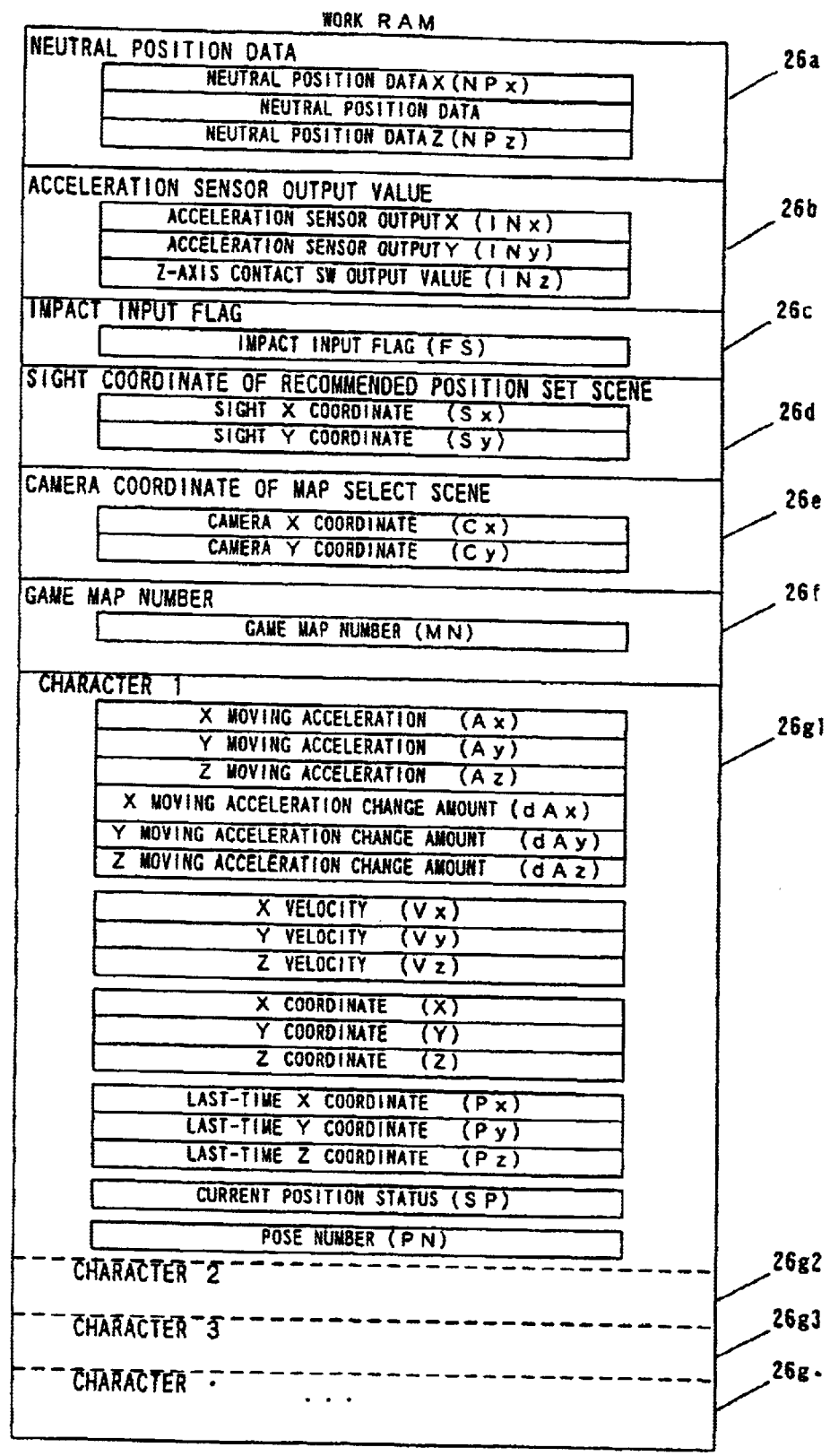
FIG. 22 is an illustrative view showing a memory map of a work RAM.

FIG. 22 is a memory map of the work RAM 26. The work RAM 26 includes memory areas 26a–26g to memorize temporary data for executing a game program by the CPU 21. Specifically, the work RAM 26 includes a memory area 26a to memorize neutral position data, a memory area 26b to memorize output values of the acceleration sensor 31 and contact switch 32, a memory area 26c to be used as an impact input flag, a memory area 26d to memorize sight coordinates on recommended position set screen, a memory area 26e to memorize camera coordinate data for map select screens, a memory area 26f to memorize game map numbers and a memory area 26g to memorize character data.

The memory area 26a stores neutral position data (NPx, NPy, NPz) to be set in a neutral position set process hereinafter described with reference to FIG. 35. This data is to be utilized as data concerning a reference tilt of the portable game apparatus for playing a game.

Figure 39:
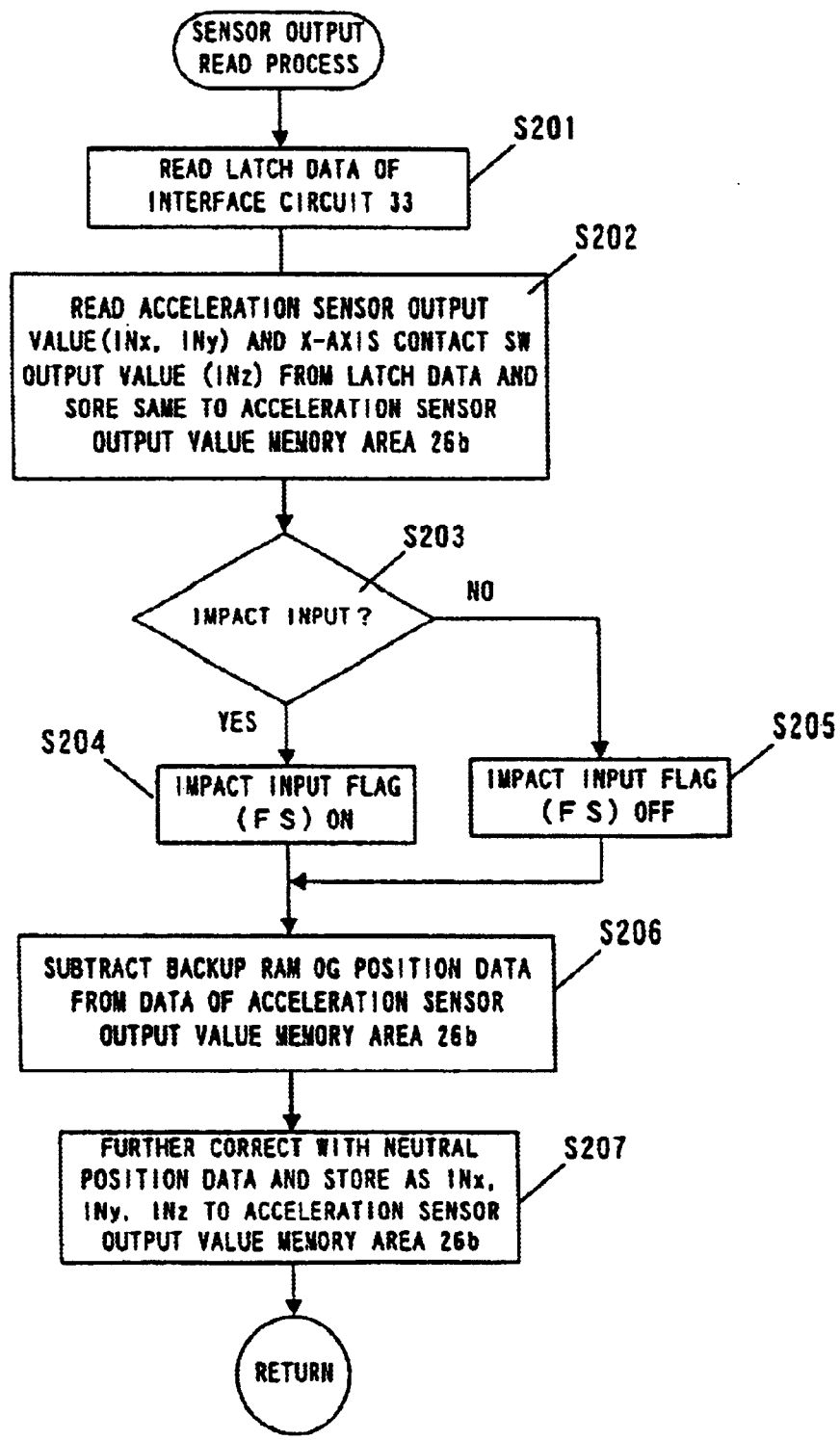
FIG. 39 is a flowchart showing a sensor output read process.

The memory area 26b memorizes output values (INx, INy, INz) of the acceleration sensor 31 and contact switch 32 which are detected by the acceleration sensor 31 and contact switch 32 and to be read out through the sensor interface 33 in a sensor output read process of FIG. 39.

The memory area 26c memorizes an impact input flag (FS). This impact input flag FS assumes 1 when equal to or greater than a constant value is the magnitude of resultant vector of a vector component in the X-axis direction taken of an acceleration input in the X-axis direction and a vector component in the Y-axis direction taken of an acceleration input in the Y-axis direction. The determination impact input is executed in a sensor output read process of FIG. 39.

The memory area 26d memorizes coordinates (Sx, Sy) of a sight (at 72 in FIG. 36) which is to be displayed on the LCD 12 in a recommended position set process hereinafter described with reference to FIG. 36 and FIG. 37.

The memory area 26e memorizes coordinates (Cx, Cy) at upper left corner of an LCD 12 display region in a game map select map which is to be displayed in a game map select process hereinafter described with reference to FIG. 38.

The memory area 26f memorizes corresponding number data (MN) to a game map having been selected by a player during a game map select process hereinafter described with reference to FIG. 38.

The memory area 26g memorizes, for each of the player characters and NPCs, moving acceleration data (Ax, Ay, Az), moving acceleration change amount data (dAx, dAy, dAz), velocity data (Vx, Vy, Vz), coordinate data (X, Y, Z), last-time coordinate data (Px, Py, Pz), current position status (SP) and pose numbers (PN).

Here, the reason of memorizing a last-time coordinate (Px, Py, Pz) on a character-by-character basis is for returning to the last-time coordinate a player character or NPC having collided with a wall or the like. Also, the reason of memorizing as current position status data (SP) coordinate land data that the player character is present is for selecting an acceleration sensor 31 and contact switch 32 output value conversion table (in-air, on-floor, on-ice, on-water) depending on a land of the coordinate at which the player character is existing. Furthermore, memorizing a corresponding identification number to a character pose as a pose number (PN) is for varing graphic data depending upon a character state (pose) (e.g. tortoise normal and upside-down positions, etc.).

Figure 23:
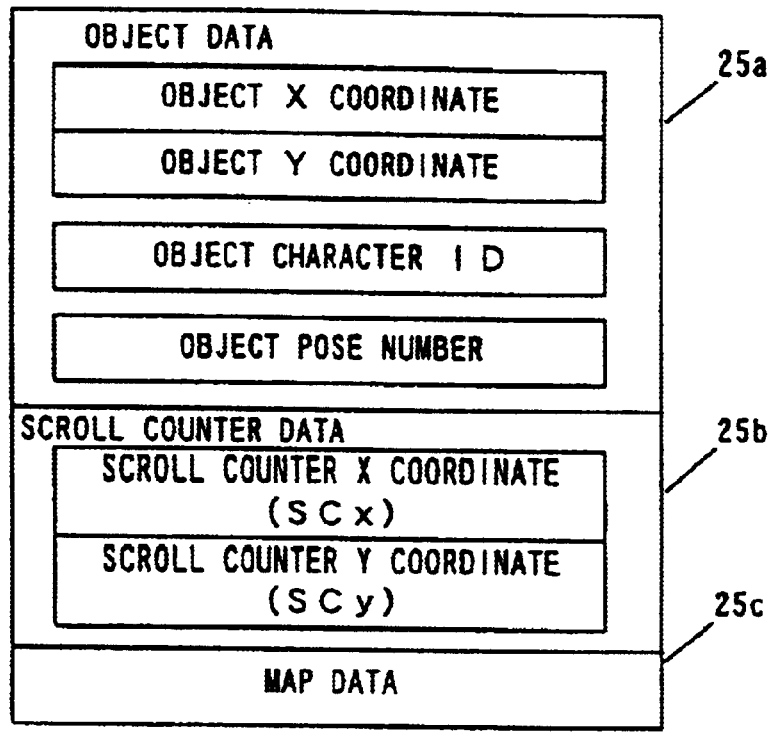
FIG. 23 is an illustrative view showing a memory map of a display RAM.

FIG. 23 is a memory map of the display RAM 25. The display RAM 25 is to temporarily memorize display data obtained through executing a game program by the CPU 21, and includes a memory area 25a to memorize object data, a memory area 25b to memorize scroll counter data and a memory area 25c to memorize map data. The memory area 25a memorizes various data (X coordinate, Y coordinate, character ID, pose number) of the existing characters in the LCD 12 display region among all the characters to appear in a game.

The game map of this embodiment is a virtual map greater than a display region of the LCD 12, part of which region (around the player character) is displayed on LCD 12. For this reason, the memory area 25b stores a relative coordinate of an upper left corner of the LCD 12 display region to the virtual map.

The memory area 25c stores game map data of the game map in a region to be displayed on the LCD 12.

Figure 24:
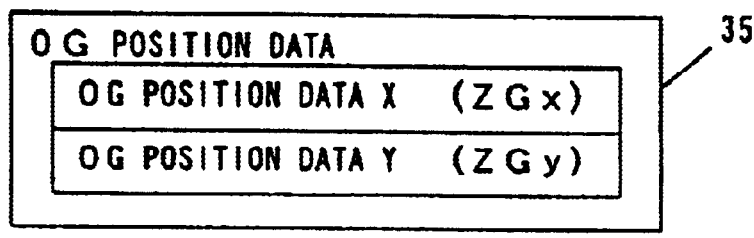
FIG. 24 is an illustrative view showing a memory map of a backup RAM.

FIG. 24 is a memory map of the backup RAM 35. The backup RAM 35 stores X-axis and Y-axis 0G position data (ZGx, ZGy). The 0G position data is to be set in a 0G set process hereinafter described with reference to FIG. 34. The 0G position data is utilized for correction where the sensor output value will not become "0" even in a state that the portable game apparatus is held horizontal, due to a reason of error in the acceleration sensor 31. Specifically, the sensor output value when the portable game apparatus is held horizontal is stored as 0G position data in the backup RAM 35, which in a game process is subtracted from a sensor output value.

FIG. 25 to FIG. 32 demonstrate in detail conversion tables output values of the acceleration sensor 31 and contact switch 32, which are stored in the memory area 34c of the program ROM 34. The tables to be stored in the memory area 34c are previously memorized with sensor output values (INx, INy, INz) of acceleration sensor 31 and contact switch 32, and data for correction or the like to be made upon utilizing an impact input flag (FS) for a game process. The correction process data includes data of correction ratio, particular correction condition and particular correction number. The table data includes a recommended position set processing table, a game map select processing table, a player character moving table and NPC moving table.

The position set processing table shown in FIG. 25 is referred to in a recommended position at process hereinafter described with reference to FIG. 37. Although the output values (INx, INy) of the acceleration sensor 31 in this table are utilized to determine a sight coordinate (Sx, Sy), the output value (INz) of the contact switch 32 and the impact input flag (FS) are not utilized therefor.

The game map select processing table shown in FIG. 26 is made reference to in a game map select process hereinafter described with reference to FIG. 38. The output values (INx, INy) of the acceleration sensor in this table are utilized for a camera coordinate (Cx, Cy) change amount. Incidentally, because the correction ratio is twice, the camera coordinate (Cx,. Cy) will be moved twice the output value (INx, INy) of the acceleration sensor 31. Although the output value (INz) of the contact switch 32 is utilized for a map determining process, the impact input flag (FS) is not utilized therefor.

The player character moving table shown in FIG. 27 to FIG. 30 is made reference to in a tilt movement process (FIG. 42) to be executed at step S263 in a player character moving process hereinafter described with reference to FIG. 40, and in an impact movement process (FIG. 43) to be executed in step S264. The moving table includes tables for in-air (FIG. 27), on-floor (FIG. 28), on-ice (FIG. 29) and underwater (FIG. 30), one of which is to be selected and referred to in accordance with a coordinate topology where the player character is present (current position status).

In the moving table, the output value X (INx) of the acceleration sensor 31 is utilized for a change amount (dAx) of an acceleration of a character being moved in the X-axis direction in a programmed fashion (hereinafter referred to as "moving acceleration") while the output value Y (INy) is utilized for a change amount (dAy) of an acceleration thereof being moved in the Y-axis direction. In the case the current position status is "in-air" (see FIG. 27), the change amount (dAx, dAy) of moving accerelation is zero. For the case of "on-floor" shown in FIG. 28, because the correction ratio is twice, twice the output value (INx, INy) of the acceleration sensor 31 provides a change amount (dAx, dAy) of moving acceleration. Also, where the output value (INx, INy) of the acceleration sensor is greater than 20 due to particular correction condition 1, the moving acceleration change amount (dAx, dAy) is limited to "40". For an "on-ice" shown in FIG. 29, three times the output value (INx, INy) of the acceleration sensor 31 provides a change amount (dAx, dAy) (i.e. this signifies greater moving amount on the ice). Meanwhile, where the output value (INx, INy) of the acceleration sensor is greater than "20" due to particular correction condition 1, the change amount (dAx, dAy) is limited to "60". For an "underwater" condition shown in FIG. 30, a half of the output value (INx, INy) of the acceleration sensor 31 gives a change amount (dAx, dAy) (i.e. this means smaller moving amount in water). Also, where the output value (INx, INy) of the acceleration sensor 31 is greater than "10" due to particular correction condition 1, the change amount (dAx, dAy) is limited to "5".

In the moving tables of FIG. 27 to FIG. 30, the output value (INz) of the contact switch 32 is utilized to determine a change amount (dAz) of moving acceleration in the Z-axis direction. Regardless of a current position status, the change amount (dAz) is "1" when the output value of the contact switch 32 is "1", and the change amount (dAz) is "−1" when the output value of the contact switch 32 is "0" in a state the player character is floating in the air.

Similarly, in the moving tables of FIG. 27 to FIG. 30, where the impact input flag (FS) is "1", it is utilized for respective X-axis and Y-axis moving acceleration change amounts (dAx, dAy). Where the current position status is "in-air" or "under-water", neglected is a state of the impact input flag (FS) as shown in FIG. 27 and FIG. 30. For a current position status of "on-floor", the X-axis and Y-axis moving acceleration change amounts (dAx, dAy) are multiplied by 3 as shown in FIG. 28. For a current position status of "on-ice", the X-axis and Y-axis moving acceleration change amounts (dAx, dAy) are multiplied by 5 as shown in FIG. 29. In this manner, where there is an impact input, the X-axis and Y-axis moving acceleration change amounts (dAx, dAy) "on-floor" or "on-ice" are increased greater than the usual, thus providing high speed movement.

The NPC moving tables of FIG. 31 and FIG. 32 are conversion tables to change tortoise movement depending upon whether the tortoise is in a normal or upside-down position. Any one of the tables is selected and made reference to, based on a tortoise direction. That is, in an NPC moving process hereinafter described with reference to FIG. 41, the tables are made reference to in a tilt movement process at step S304 (subroutine shown in FIG. 42) and in an impact movement process at step S305 (subroutine shown in FIG. 43).

In the NPC moving table, the output value X (INx) and output value Y (INy) of the acceleration sensor 31 are utilized to determine respective change amounts (dAx, dAy) in the X-axis and Y-axis directions. That is, because for a tortoise normal position the correction ratio is a half times as shown in FIG. 31, the acceleration sensor 31 output values (INx, INy) multiplied by a half provide respective X-axis and Y-axis moving acceleration change amounts (dAx, dAy). Also, where the output values (INx, INy) of the acceleration sensor 31 are smaller than "10" due to particular correction condition 1, the change amounts (dAx, dAy) are "0". In other words, for the case of a tortoise normal position, setting is made not to cause sliding by a small tilt input. Also, where the acceleration sensor 31 output values (INx, INy) are greater than "20" due to particular correction condition 2, the change amounts (dAx, dAy) are limited to "10". On the other hand, where the tortoise is upside down, twice the output values (INx, INy) of the acceleration sensor 31 provide respective X-axis and Y-axis change amounts (dAx, dAy). Consequently, when the tortoise is upside down, the moving amount is greater as compared to that in the normal position. Meanwhile, where the acceleration sensor 31 output values (INx, INy) are greater than "20" due to particular correction condition 1, the change amounts (dAx, dAy) are limited to "40".

Furthermore, the output value (INz) of contact switch 32 is utilized to determine tortoise inversion to a normal and inverted position. Each time the output value of contact switch 32 becomes "1", the tortoise turns to a normal or inverted state in a repetitive manner. Incidentally, the impact input flag (FS) is not utilized for the NPC movement process.

Figure 33:
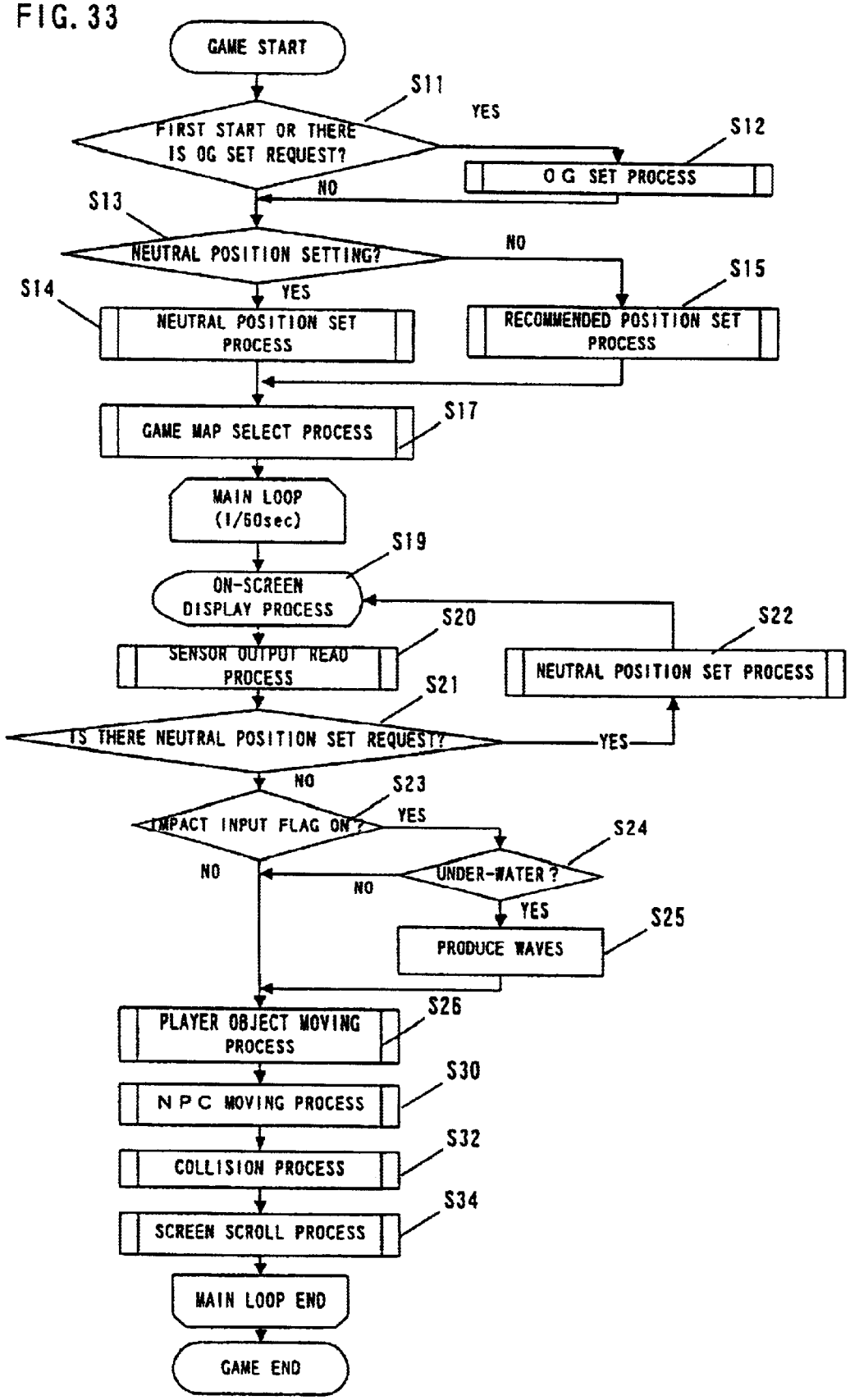
FIG. 33 is a flowchart showing a main routine.

FIG. 33 is a flowchart of a main routine. If a cartridge 30 is loaded onto the game machine main body 10 and the power switch of the game machine main body 10 is turned on, the CPU 21 starts to process the main routine of FIG. 33. First, in step S11 it is determined whether it is a first starting or not, or whether a player requested for 0G setting (e.g. whether started while pressing the operation key 13b of FIG. 1) or not. If not a first starting and there was no 0G set request, the process advances to step S13. Meanwhile, when a first starting or there was a 0G set request, a 0G set process (see FIG. 34) is made in step S12 and then the process proceeds to step S13.

In step S13 it is determined whether the player determines to set from a neutral position to an arbitrary tilt. When setting to an arbitrary tilt was determined, the process advances to step S14 to perform a neutral position set process (see FIG. 35) and then the process advances to step S17. On the other hand, when selection was made not to set to an arbitrary tilt, the process advances to step S15 to perform a recommended position set process (see FIG. 36 and FIG. 37) and then the process proceeds to step S17.

Here, the neutral position setting is meant to set a reference tilt of the portable game apparatus for playing a game. The recommended position setting is meant to set a neutral position based on data wherein the data is concerned with a proper neutral position in accordance with a game content (the recommended position sight target coordinate data in the memory area 34d) that have been previously memorized in a game program.

In step S17 a game map select process (see FIG. 38) is performed so that one of a plurality of game maps is selected by the player, then the process advances to a main loop.

Here, the main loop is a process from step S19 to step S34, which is repeatedly executed until game over or game clear is reached. In step S19 an image display process is conducted. In this process, a background scene is displayed based on the map data memorized in the memory area 34b. Furthermore, for the characters on the LCD 12 display area among the characters of the memory areas 26g1–26gn, the display (dot) data for a certain pose of a certain character designated by a pose number (PN) is read out of the memory area 34a. The display RAM 25 is written by required data such that the character display data in the relevant pose is displayed in a corresponding position on the LCD 12 to the X, Y, Z coordinate memorized in the memory area 26g1. The display data written to the display RAM 25 is sequentially read out so that a game scene can be displayed on the LCD 12.

In step S20 a sensor output read process (see FIG. 39) is performed. The output values of the acceleration sensor 31 and contact switch 32 are read out through the sensor interface 33 and then corrected. In step S21 it is determined whether there was a neutral position set request or not. If there was no request, the process advances to step S23 while if there was a request the process proceeds to step S22. In step S22 a neutral position set process is performed and then the process returns to step S19. In the step of this step S22, one operation key (e.g. operation key 13e shown in FIG. 1) is assigned to an exclusive operation key for neutral position setting so that an interrupt process can be made by pressing the operation key 13e even during playing a game. Thus, resetting to a neutral position is possible at all times.

In step S23 it is determined whether the impact input flag is ON ("1") or not. If the impact input flag is OFF ("0"), the process proceeds to step S26 while if ON the process advances to step S24. In step S24 it is determined whether the topology of current coordinate that the player character is present (current position status) is underwater or not. If not underwater is determined, the process advances to step S26 while if determined underwater, the process advances to step S25. In step S25 a wave producing process is performed (wave movement display is provided as shown in the lower portion in FIG. 19). Specifically, a display process is made to cause waves depending upon and in a direction of a resultant vector, wherein the resultant vector is given by a vector component in the X-axis direction taken of a sensor output value X (INx) and a vector component in the Y-axis direction is taken of a sensor output value Y (INy). Due to this, the player can have a feeling as if the impact applied to the portable game apparatus was reflected in an environment (water) of the game. After step S25, the process proceeds to step S26.

In step S26 a player character moving process (see FIG. 40 and FIG. 42 to FIG. 45) is performed. In step S27 an NPC moving process (see FIG. 41 to FIG. 45) is performed. In step S32 a process of collision of the player character with NPC or the like (see FIG. 46) is made. In step S34 a screen scroll process (see FIG. 49) is performed.

Figure 34:
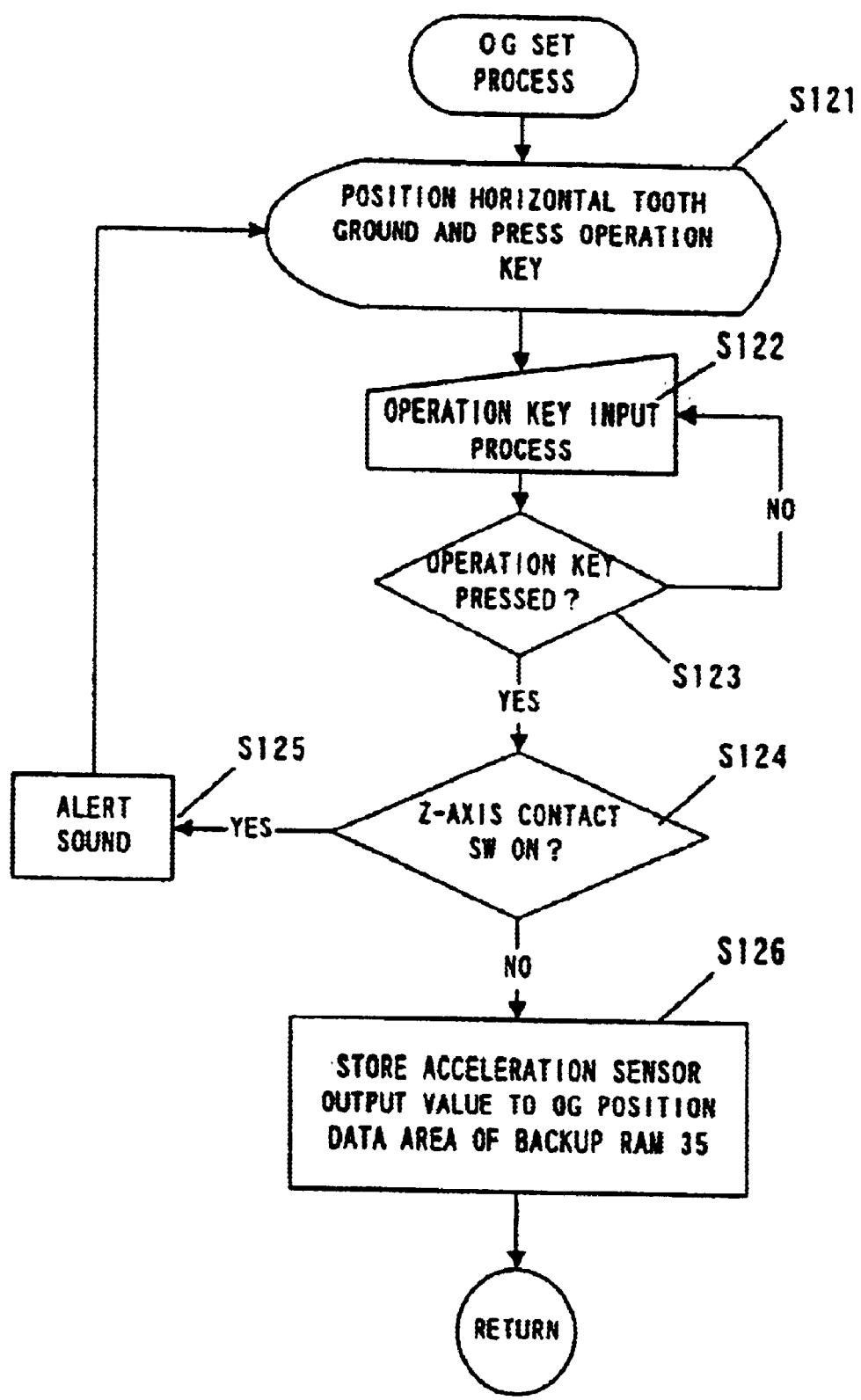
FIG. 34 is a flowchart showing a 0G set process.

FIG. 34 shows a subroutine flowchart for a 0G set process. This subroutine performs a process to memorize as 0G position data to backup RAM 35 an output value of the acceleration sensor when the portable game apparatus (or the LCD 12 display surface) is held horizontal.

In step S121 a message "POSITION HORIZONTAL TO GROUND AND PRESS OPERATION KEY" is displayed on the LCD 12, requesting the player to hold the portable game apparatus (or the LCD 12 display surface) in a horizontal state. In step S122 an operation key output process is performed. In step S123, if depression of an operation key (e.g. operation key 13b of FIG. 1) for determination is determined, it is then determined in step S124 whether the contact switch 32 is ON or not. When the contact switch 32 is ON, an alert sound is generated in step S125 and the process returns to step S121. This is because, where the contact switch is ON, the LCD in its display surface is directed downward and the player is requested to perform setting again. In step S124, where the contact switch is determined off, then in step S126 the output value of the acceleration sensor 31 at this time is memorized as 0G position data to the backup RAM 35.

Figure 35:
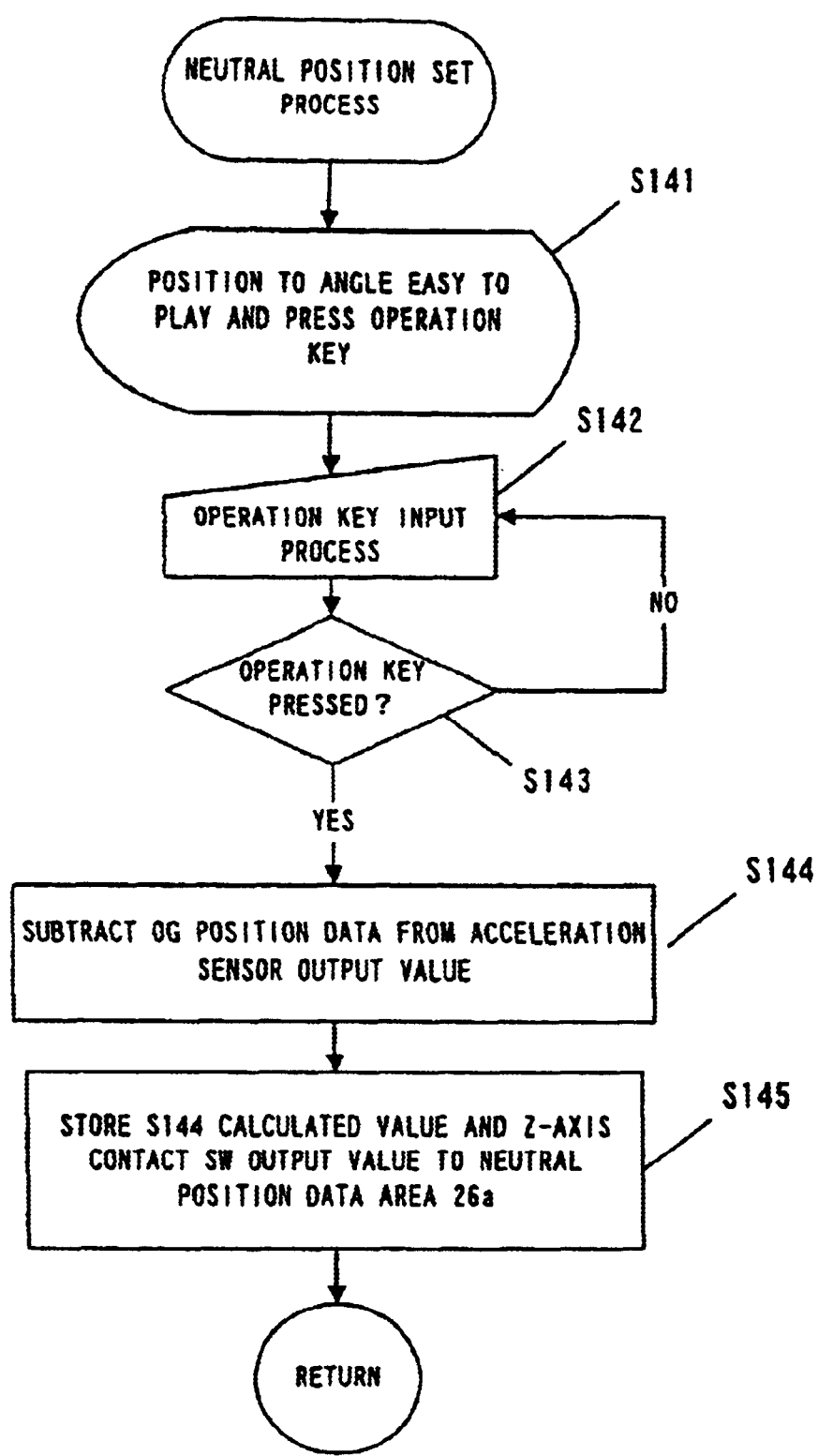
FIG. 35 is a flowchart showing a neutral position set process.

FIG. 35 is a subroutine flowchart for a neutral position set process. This subroutine performs process that the player arbitrarily determines a portable game apparatus at a holding angle easy to play a game. The output value of the acceleration sensor 31 and contact switch 32 at that time are memorized as neutral position data to the work RAM 26.

In step S141 a message "POSITION AT ANGLE EASY TO PLAY AND PRESS OPERATION KEY" is displayed on the LCD 12. In step S142 an operation key input process is made. In step S143, if the depression of an operation key for determination (e.g. operation key 13b of FIG. 1) is determined, then in step S144 a correction process is performed by subtracting 0G position data from an output value of the acceleration sensor 31 at this time (process to make the neutral position data to data of a corresponding tilt with respect to horizontal state). In step S145 a correction value of the output of the acceleration sensor 31 (calculation result of step S144) and an output value of the contact switch 32 are memorized as neutral position data to the memory area 26a of the work RAM 26.

Figure 36:
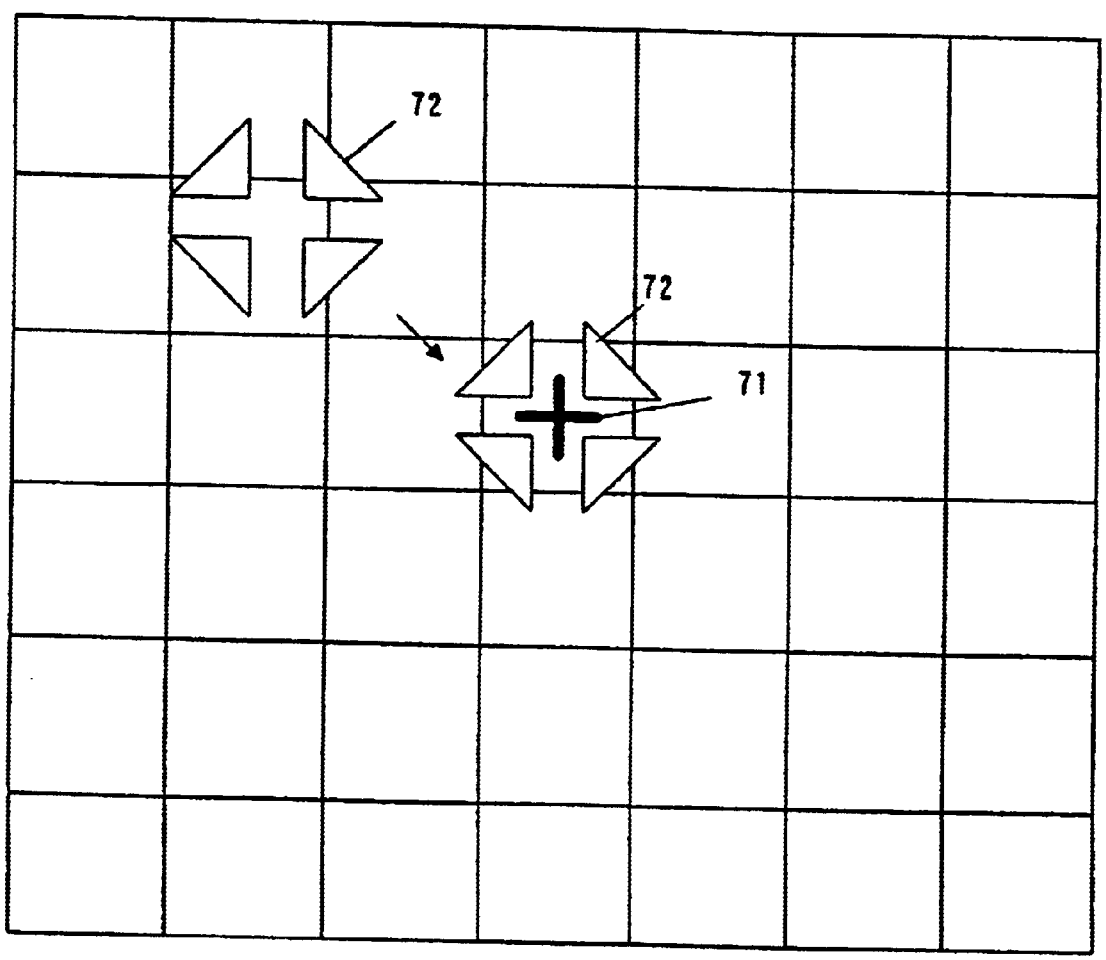
FIG. 36 is an illustrative view showing one example of a recommended position set process scene.

FIG. 36 is one example of an LCD screen in the recommended position set process. On the LCD 12 a sight target coordinate 71 is fixedly displayed based on the recommended position sight target coordinate memorized in the program ROM 34. Furthermore, a sight 72 is displayed movably depending upon a tilt of the portable game apparatus. The sight 72 is moved due to tilting of portable game apparatus by the player. When the sight 72 is overlapped with the sight target coordinate 71 (at 72' shown in FIG. 36), the operation key 13b is pressed. Due to this, the tilt of the portable game apparatus at this time is set as a recommended position.

Figure 37:
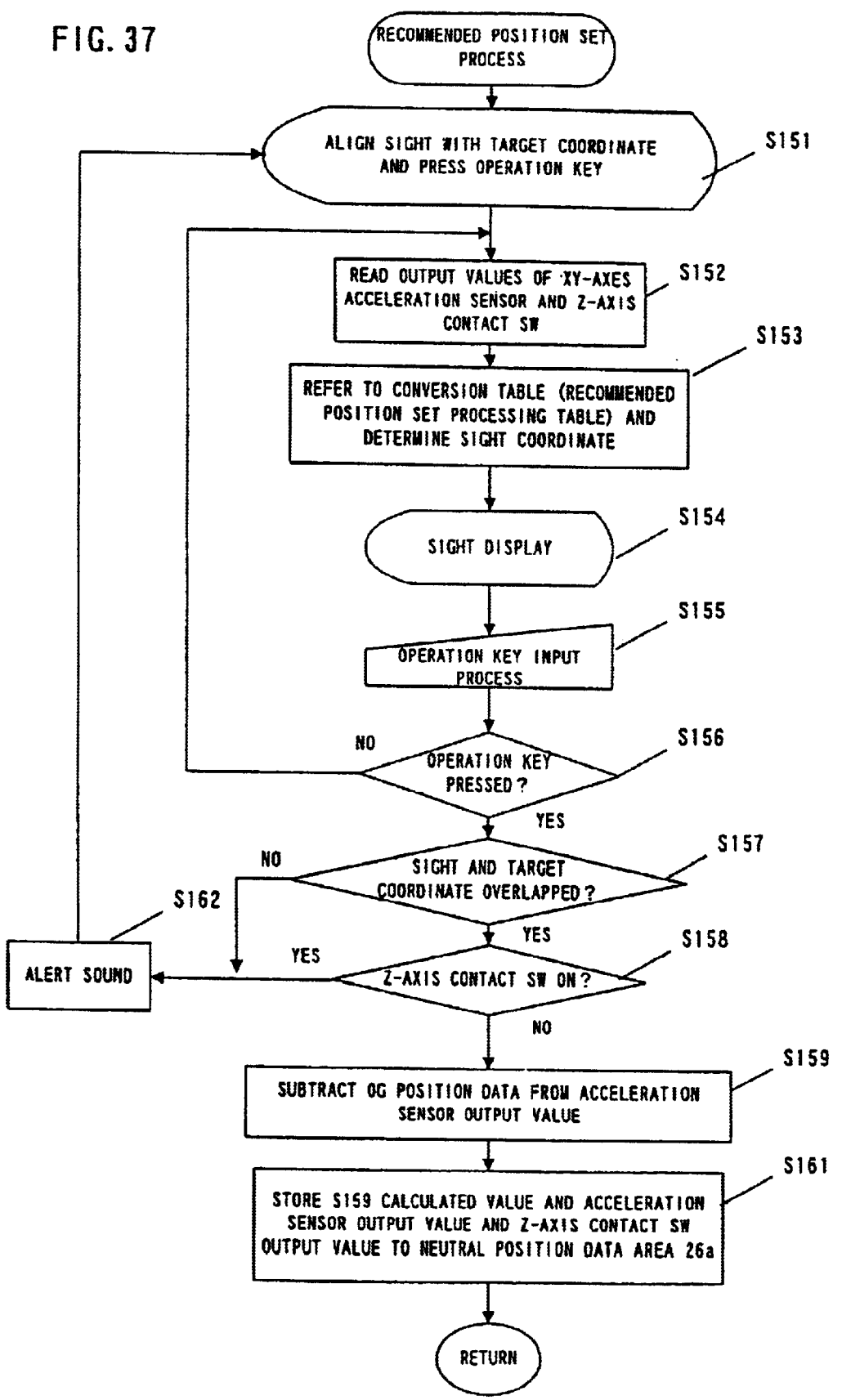
FIG. 37 is a flowchart showing a recommended position set process.

FIG. 37 shows a subroutine flowchart of a recommended position set process. In step S151 a message "ALIGN SIGHT WITH TARGET COORDINATE AND PRESS OPERATION KEY" is displayed on the LCD 12. In step S152 the output values (INx, INy, INz) of the acceleration sensor 31 and contact switch 32 are read out. In step S153, reference is made to the recommended position set process table shown in FIG. 25. By referring to this table, a sight coordinate (Sx, Sy) is determined based on the output values (INx, INy) of the acceleration sensor 31. In step S154, a sight 72 is displayed on the LCD 12 based on a determined sight coordinate (Sx, Sy). For example, where the portable game apparatus is tilt in + (plus) direction about the X-axis, a sight is displayed in a lower half region of a display surface center of the LCD 12. As the tilt is greater, the display position becomes closer to a lower end of the display surface. Conversely where tilted in a − (minus) direction about the X-axis, a sight is displayed in an upper half region of the LCD 12 display surface center. As the tilt is greater, the display position becomes closer to an upper end of the display surface. Also, where tilted in a + (plus) direction about the Y-axis, display is made in a right half region whereas when tilted in a − (minus) direction, display is in a left half region. The player may tilt the portable game apparatus to vary the position of the sight 72 to a position of the fixedly-displayed sight target coordinate 71 (at 72' in FIG. 36).

In the next step S155 an operation key input process is made. In step S156 it is determined whether the operation key for determination (e.g. operation key 13*b* of FIG. 1) was depressed or not. If the determination key is not pressed is determined, the process returns to S152 while if the depression of determination key is determined, the process advances to step S157. In step S157 it is determined whether the sight 72 is overlapped with the sight target coordinate 71 or not. If determined not overlapped, then in step S162 an alert sound is generated, and process returned to step S151 to request the player to set again for a recommended position. On the other hand, if the sight 72 is determined overlapped with the sight target coordinate 71, then it is determined in step S158 whether the contact switch 32 is ON or not. If the contact switch 32 is determined ON, the process advances to step S162. If the contact switch is determined OFF, then in step S159 an output value of the acceleration sensor 31 is read out to perform a correction process wherein the 0G position data is subtracted from a read-out value. In step S161 the correction value of the output of acceleration sensor 31 (calculation result of step Ss159) and the output value of contact switch 32 are memorized as neutral position data to the memory area 26*a*.

Figure 38:
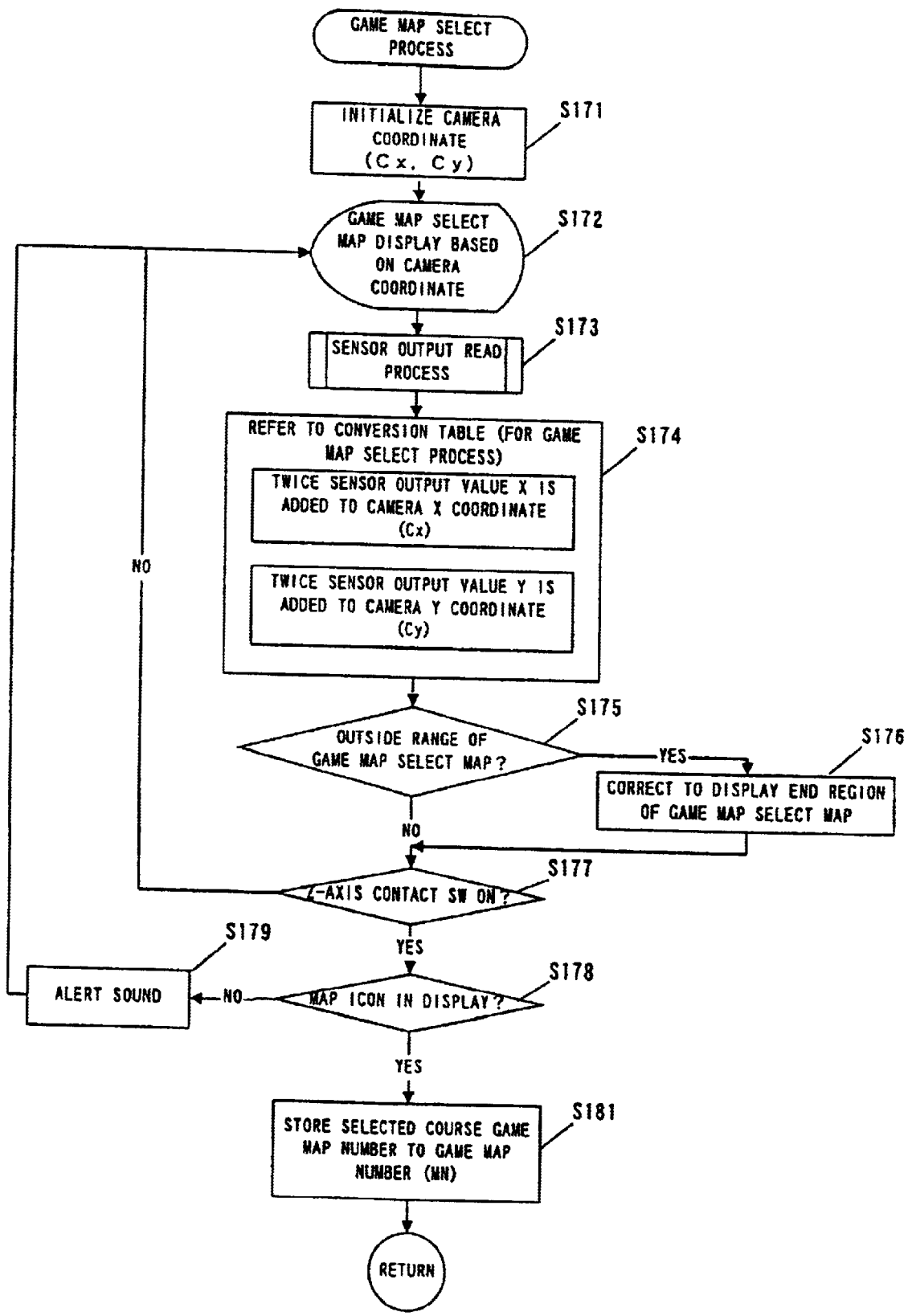
FIG. 38 is a flowchart showing a game map select process.

FIG. 38 is a subroutine flowchart of a game map select process. In this subroutine, the player selects any one of a plurality of game maps stored in the game program. The screen of game map select process is displayed, for example, as shown in FIG. 16 mentioned before. On the LCD 12, one region of a game-map select map is displayed. The player makes slide input in the X-axis or Y-axis direction to move the display region on the LCD 12 thereby displaying map icons (at A–D in FIG. 16) within the display region. Then, an acceleration is inputted in the Z-axis direction. This results in selection of corresponding map or course to the map icon (e.g. any of A–D of FIG. 16) being displayed on the LCD 12 upon inputting the acceleration in the Z-axis direction.

Specifically, in step S171 a camera coordinate (Cx, Cy) is initialized. In step S172 one region of the game-map select map is displayed on the LCD 12 based on the camera coordinate (Cx, Cy). In step S173 a sensor output read process (see FIG. 39) is made. As a result, the output values of the acceleration sensor 31 and contact switch 32 are read out and corrected. In step S174 a table shown in FIG. 26 is referred to. Specifically, the camera coordinate (Cx, Cy) is changed based on the sensor output values (INx, INy). Because the correction ratio is twice, the camera coordinate (Cx, Cy) is varied by an amount twice the sensor output value (INx, INy). For example, when the sensor output value (INx) is 5, the camera coordinate (Cx) is rendered +10. In step S175 it is determined whether the display region based on the camera ordinate (Cx, Cy) is outside a range of the game map select map or not. If not outside the range, the process advances to step S177 while if in outside the range the process proceeds to step S176. In step S176 correction is made so as to display an end region of the game-map select map. In the subsequent step S177 it is determined whether the contact switch 32 is ON or not. If the contact switch 32 is determined OFF, the process returns to step S172. If the contact switch 32 is determined ON, then it is determined in step S178 whether any one of the map icons (A-D in FIG. 16) is displayed in the display range of the LCD 12 or not. If it is determined that no map icon is displayed within the display region, then in step S179 an alert sound is generated and the process returned to step S172. If it is determined that a map icon is displayed within the display range, then in step S181 a corresponding game map number (MN) to the map icon being displayed is written to the work RAM 26.

FIG. 39 is a subroutine flowchart for a sensor output read process. In this subroutine, the output values of the acceleration sensor 31 and contact switch 32 are read out to perform a correction process. Specifically, from the data of the latch 334 and latch 335 are read output values (INx, INy) of the acceleration sensor 31 and an output value (INz) of the contact switch 32. Furthermore, a correction process is made based on 0G position data and neutral position data.

In step S201, data is read out of the latch 334 and latch 335. In step S202, acceleration sensor 31 output values (INx, INy) and contact switch 32 output value (INz) are read from the latch data, and stored as acceleration sensor output data to the memory area 26*b*. In step S203 it is determined whether there was an impact input or not. Specifically, it is determined whether equal to or greater than a given value a magnitude of a resultant vector having vector component in the X-axis direction taken of the acceleration sensor 31 output value X (INx) and a vector component in the Y-axis direction taken of the acceleration sensor 31 output value Y (INy). If determined equal to or greater than a given value, then in step S204 the impact input flag (FS) is rendered "1" and the process advances to step S206. If the resultant vector magnitude is determined smaller than the given value, then in step S205 the impact input flag (FS) is rendered "0" and the process advances to step S206. In step S206, the 0G position data memorized in the backup RAM 35 is subtracted from the acceleration sensor 31 output value memorized in the memory area 26*b*, thereby conducting a correction process. In step S207, correction is made based on the neutral position data, and the correction result is memorized as INx, INy and INz to the memory area 26*b*.

The correction with the neutral position data is performed on the output value X (iNx) and output value Y (INy) of the acceleration sensor 31 by subtracting the values of the neutral position data (NPx, NPy). For the output value (INz) of contact switch 32, when the value of neutral position data (NPz) is "1", "0" and "1" are inverted.

Figure 40:
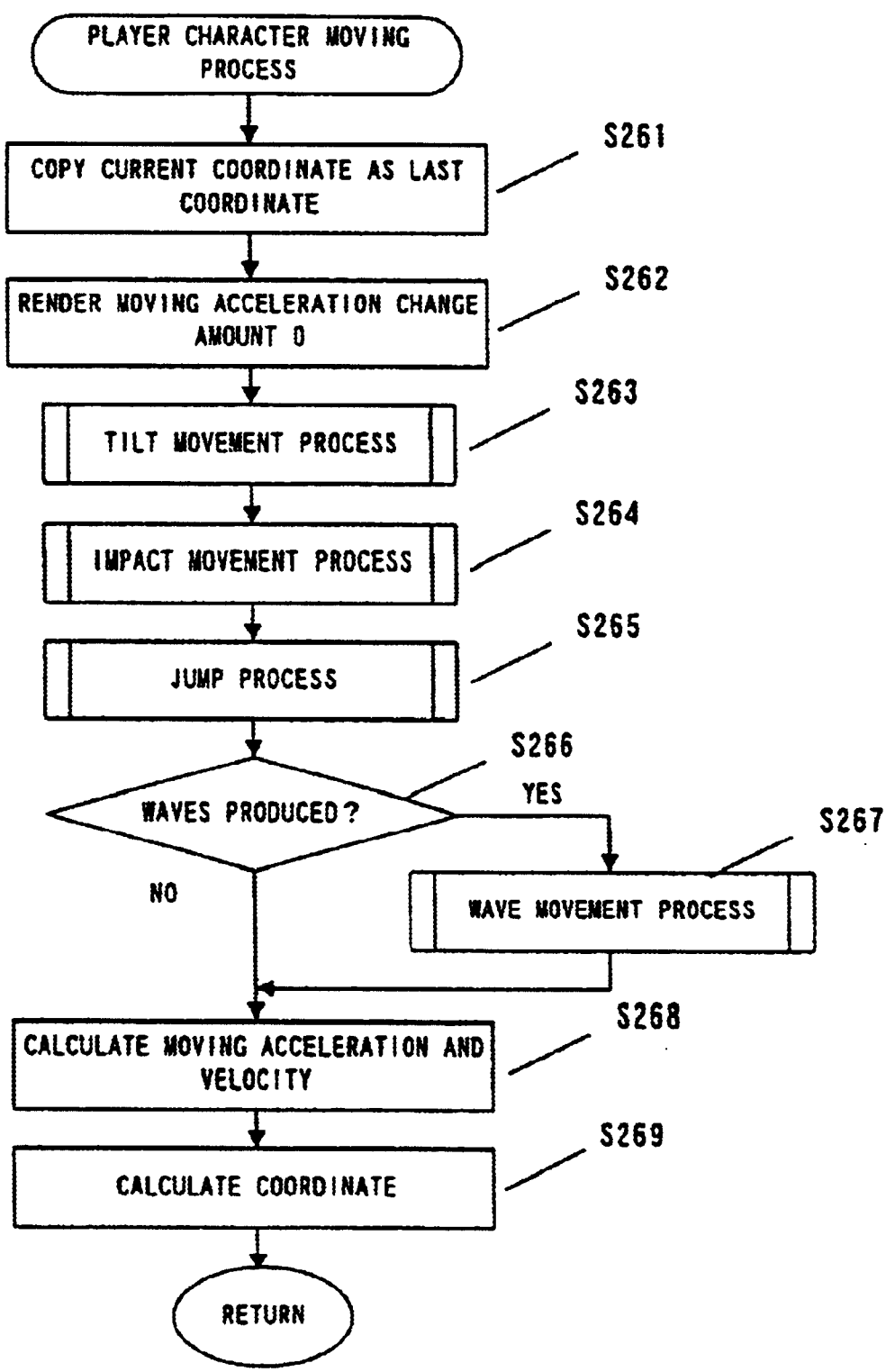
FIG. 40 is a flowchart showing player object moving process.

FIG. 40 shows a subroutine flowchart of a player character moving process. In step S261, a current coordinate (X, Y, Z) of the player character is memorized as a last-time coordinate (Px, Py, Pz). This process is required, in a collision process hereinafter described with reference to FIG. 46, to return to a last-time coordinate when the player character collide with a wall. In step S262 moving acceleration change amounts (dAx, dAy, dAz) are initialized. In step S263 a tilt movement process (see FIG. 42) is performed. In step S264 an impact movement process (see FIG. 43) is made. In step S265 a jump movement process (see FIG. 44) is performed. In step S266 it is determined whether a wave producing process was made in step S25 of FIG. 33 stated before or not. If no waves are produced, then the process advances to step S268. If wave generation is determined, then in step S267 a wave movement process (see FIG. 45) is made and then the process proceeds to step S268.

In step S268, moving accelerations (Ax, Ay, Az) are calculated based on a moving acceleration change amounts (dAx, dAy, dAz) determined by the tilt movement process, impact movement process, jump process and wave movement process of steps S263 to S267. Furthermore, velocities (Vx, Vy, Vz) are calculated based on the moving accelerations (Ax, Ay, Az). In step S269, a coordinate position (X, Y, Z) after movement is calculated based on the velocities (Vx, Vy, Vz).

Figure 41:
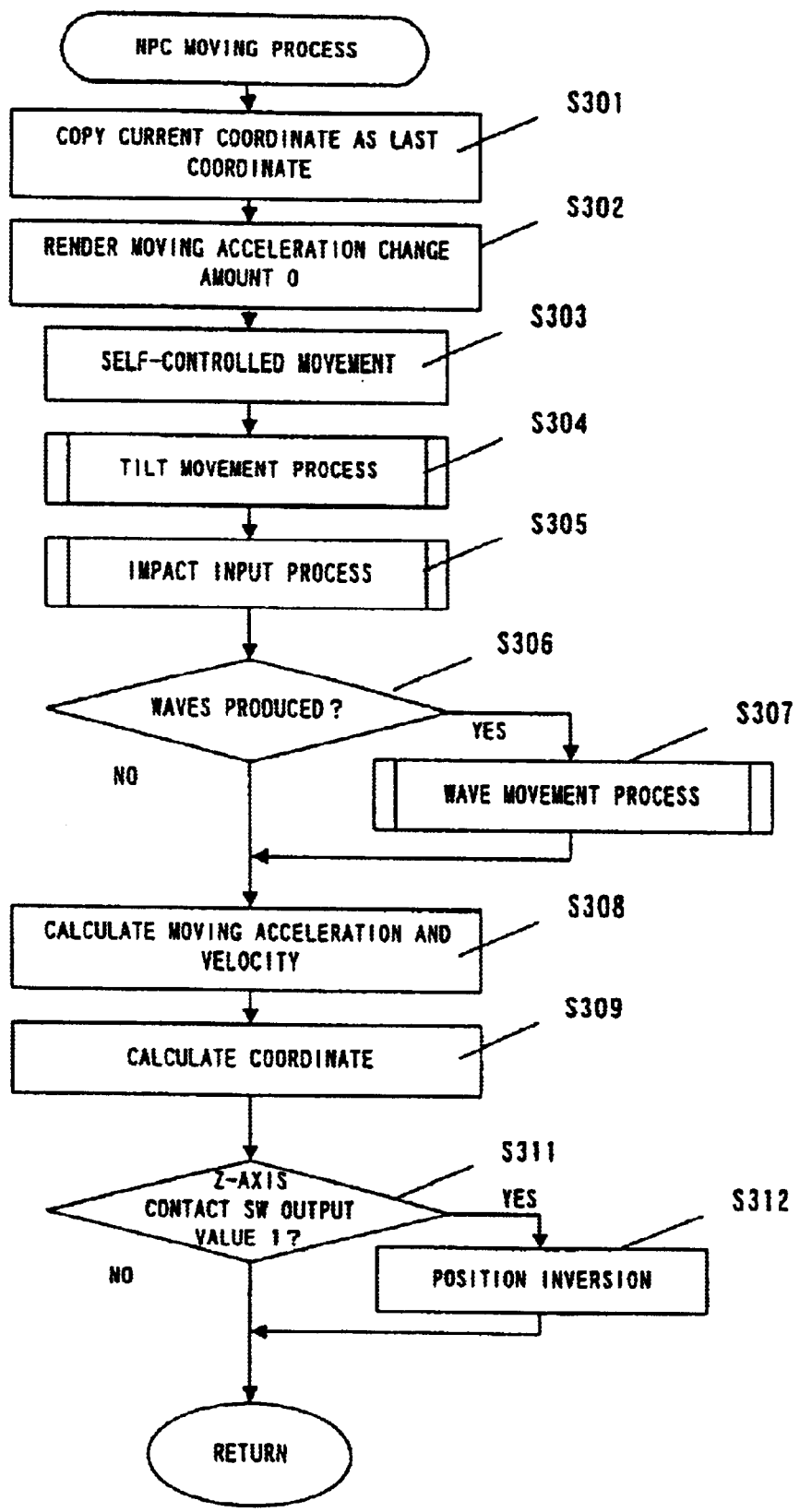
FIG. 41 is a flowchart showing an NPC movement process.

FIG. 41 is a subroutine flowchart of an NPC movement process. A plurality of NPCs exist, for which the process of steps S301 to S311 is repeatedly executed.

In step S301 a current coordinate (X, Y, Z) is memorized to a memory area of the last-time coordinate (Px, Py, Pz). In step S302 the moving acceleration change amount (dAx, dAy, dAz) are initialized. In step S303 an NPC self-controlled movement process is executed based on the game program. For example, moving acceleration change amounts (dAx, dAy, dAz) for tortoise are determined based on a random number value. In step S304 a tilt movement process (see FIG. 42) is executed. In step S305 an impact movement process (see FIG. 43) is executed. In step S306 it is determined whether a wave producing process has been made in step S25 or not. If no wave production is determined, the process advances to step S308. If waves have been produced is determined, then in step S307 a wave movement process (see FIG. 45) is executed and then the process advances to step S308.

In step S308, moving accelerations (Ax, Ay, Az) are calculated based on the moving acceleration change amounts (dAx, dAy, dAz) determined by the self-controlled movement process, tilt movement process, impact movement process and wave movement process of steps S303 to S307. Furthermore, velocities (Vx, Vy, Vz) are calculated based on the movement accelerations (Ax, Ay, Az). In step S309 an NPC coordinate position (X, Y, Z) after movement is calculated based on the velocities (Vx, Vy, Vz). In step S310 it is determined whether an output value (INz) of the contact switch 32 is "1" or not. In the case that the contact switch 32 output value (INz) is "0", the NPC movement process subroutine is ended. Where the contact switch 32 output value (INz) is "1", an inversion process to a normal or upside-down position is executed in step S311. For example, by changing a pose number (PN) of the character data in the work RAM 26, tortoise display (dot) data to be read out of it is switched from normal to upside-down data.

Figure 42:
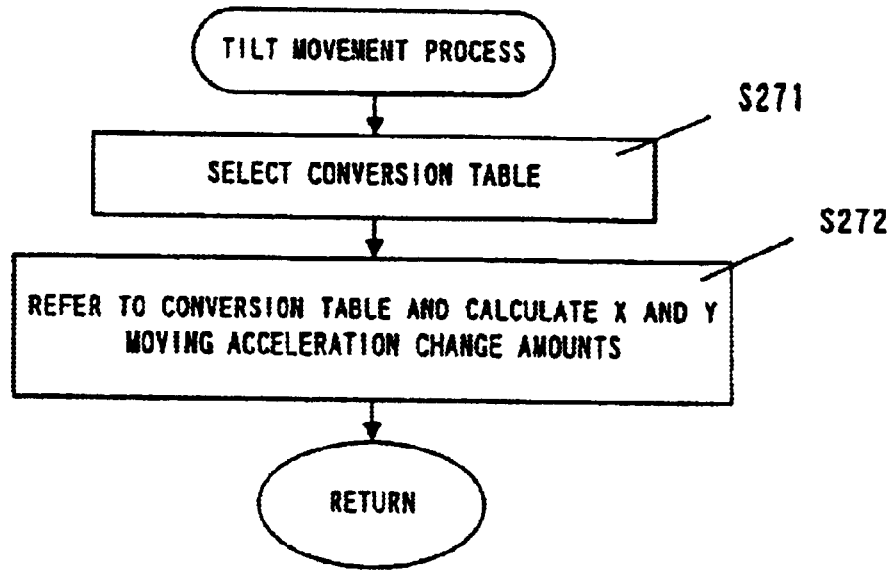
FIG. 42 is a flowchart showing a tilt movement process.

FIG. 42 shows a subroutine flowchart of a tilt movement process. In this subroutine, moving acceleration change amounts (dAx, dAy) are calculated such that the character (player character and NPC) rolls (slides) depending upon a tilt (tilt input) of the portable game apparatus. In step S270 is selected an acceleration sensor 31 output value conversion table. Specifically, for a moving process on the player character any one is selected of the in-air, on-floor, on-ice and underwater of FIGS. 27 to 30 in accordance with a current position status. For an NPC movement process, selected is either one of the normal position table of FIG. 31 or upside-down table of FIG. 32 depending upon the pose number. In step S271 after step S270, the selected conversion table is made reference to and X-axis and Y-axis moving acceleration change amounts (dAx, dAy) are calculated respectively based on an output value X (INx) and output value Y (INy) of the acceleration sensor 31.

Figure 43:
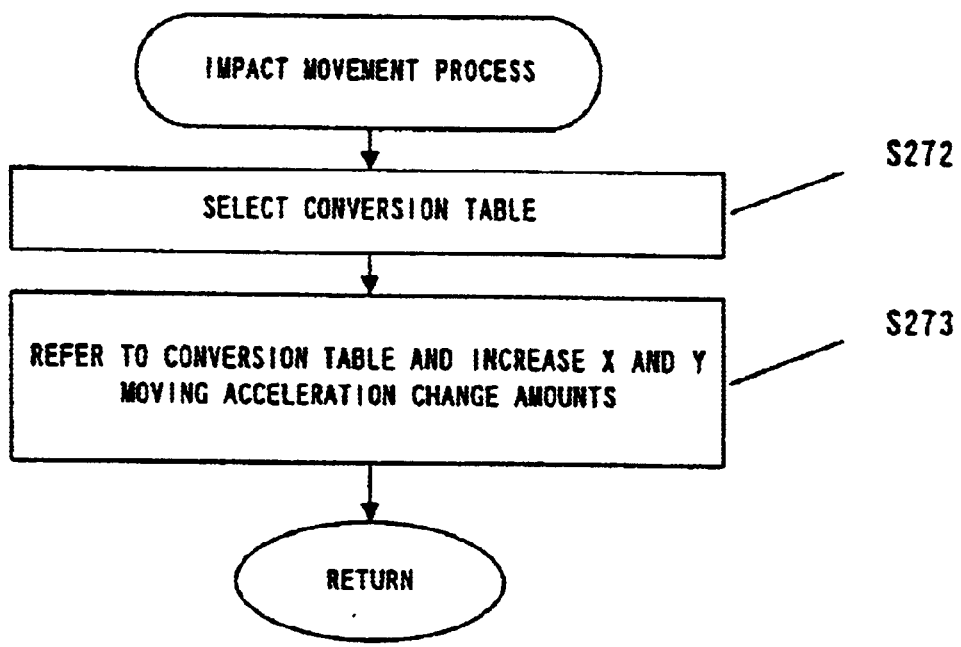
FIG. 43 is a flowchart showing an impact movement process.

FIG. 43 shows a flowchart of an impact movement process. In this subroutine, moving acceleration change amounts (dAx, dAy) are increased to cause the player character to dash (move at high speed) upon receiving an impact input. Incidentally, because the NPC movement tables (FIG. 31 and FIG. 32) have been set to ignore an impact input flag, the NPC is not affected by an impact input. Alternatively, setting may be made to cause the NPC to move at high speed where an impact is inputted. In step S272 is selected an acceleration sensor 31 output value conversion table. Specifically, any one is selected of the in-air, on-floor, on-ice and underwater of FIG. 27 to FIG. 30, depending upon a current position status. In step S273, the selected conversion table is made reference to and X-axis and Y-axis moving acceleration change amounts (dAx, dAy) are increased respectively based on an impact input flag (FS) value.

Figure 44:
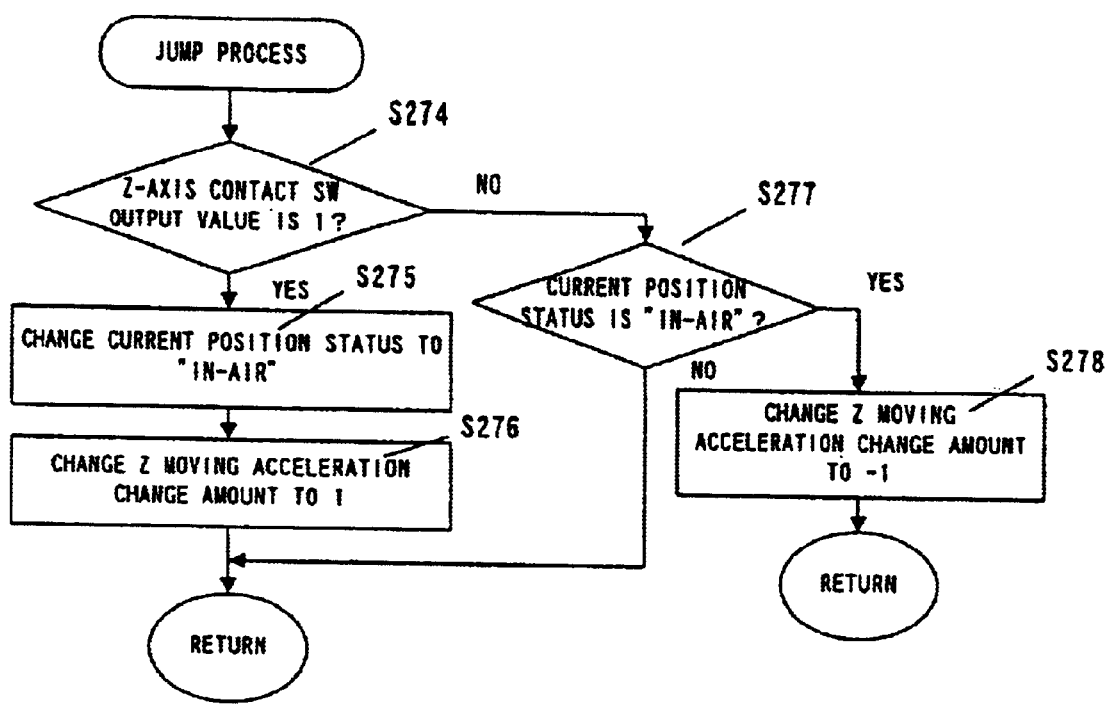
FIG. 44 is a flowchart showing a jump movement process.

FIG. 44 shows a flowchart of a jump process. In this subroutine, when there is an acceleration input in the Z-axis direction (when the output value (INz) of contact switch 32 is 1), a display process is made to cause the player character to jump. Also, when there is no acceleration input in the Z-axis direction in a state the player character is floating in the air, a display process is made to descend the player character.

In step S274 it is determined whether the output value (INz) of contact switch 32 is 1 or not. when the output value (INz) of contact switch 32 is "1", the current position status (PS) is set in the air in step S275. Thereafter in step S276 the Z moving acceleration change amount (dAz) is set to "1". When the output value (INz) of contact switch 32 is 0, it is determined in step S277 whether the player character is in a state of floating in the air or not. When not floating in the air, the jump process is ended. Where in floating in the air, the Z moving acceleration change amount (dAz) is set to "31 1" in step S278 and then the jump process is ended.

Figure 45:
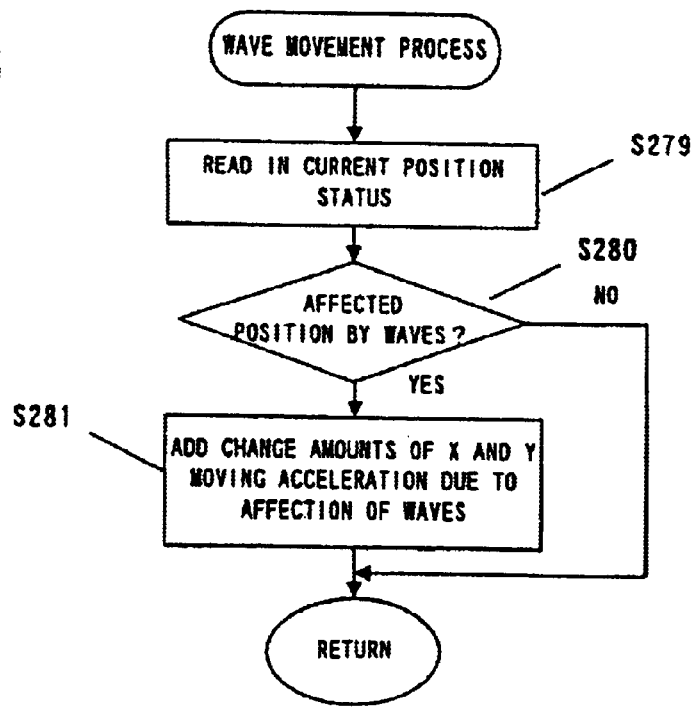
FIG. 45 is a flowchart showing a wave movement process.

FIG. 45 shows a flowchart of a wave movement process. In this subroutine, a moving acceleration change amount is calculated such that the player character or NPC is flowed away by the waves produced due to impact input. In step S279 a current position status is read in. In step S280 it is determined whether the current position status is in a position to undergo an affection of waves or not (i.e. under-water or not). If determined as a position free from an affection of waves, the wave movement process is ended. If determined as a position to undergo an affection of waves, then in step S281 are calculated respective X-axis and Y-axis moving acceleration change amounts due to an affection of waves and added to the change amounts calculated by the tilt movement process and impact movement process.

Figure 46:
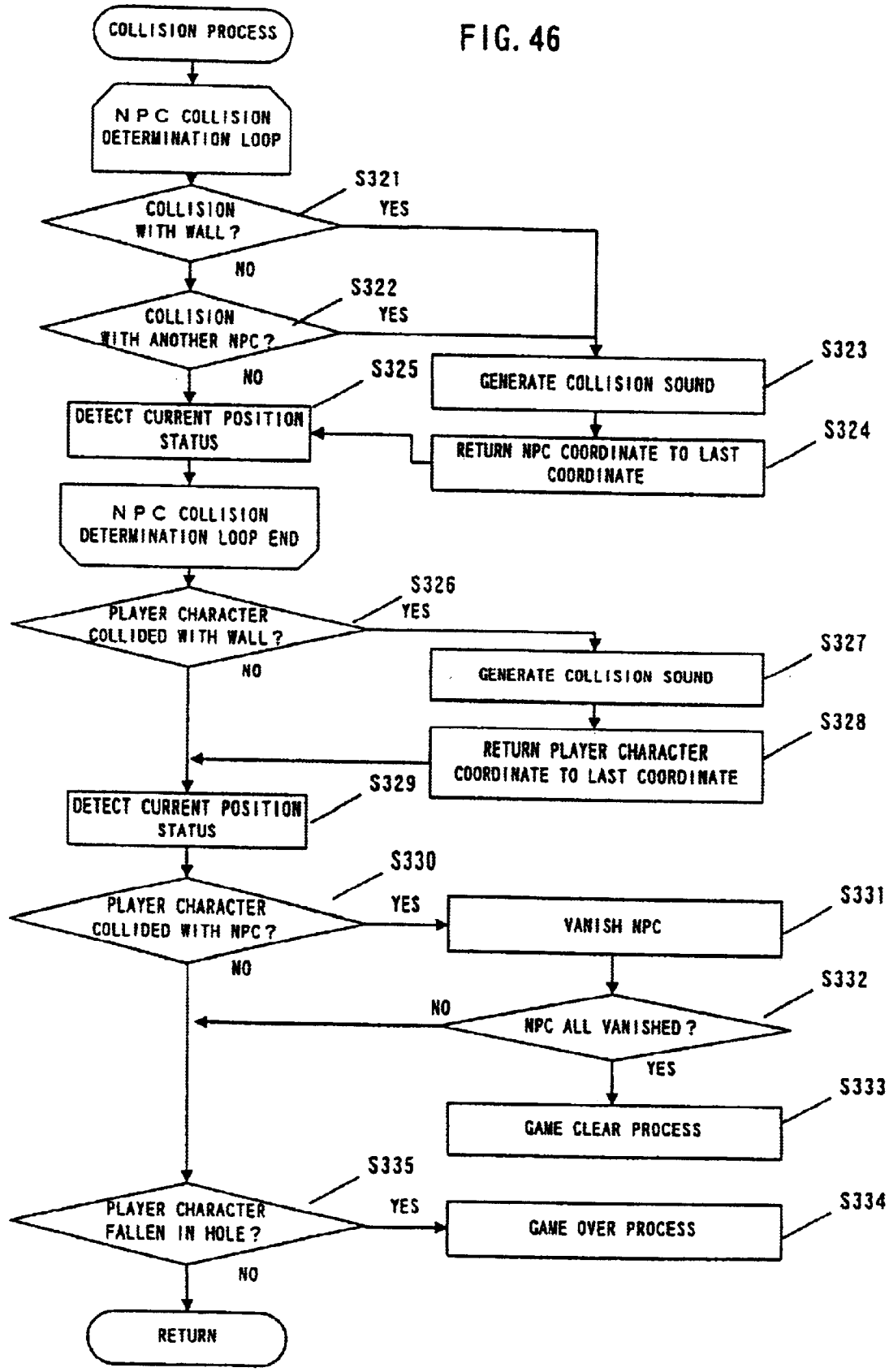
FIG. 46 is a flowchart showing a collision process.

FIG. 46 shows a flowchart of a collision process. In steps S321 to S325, an NPC collision determination process is carried out. The NPC collision determination process is repeated to the number of NPCs. In step S321 it is determined whether an NPC has collided with a wall or not. If determined as collision with a wall, the process proceeds to step S323. If no collision is determined, the process advances to step S322 wherein it is determined whether there has been a collision with another NPC or not. If determined as collision with another NPC, the process advances to step S323. If determined as no collision with another NPC, the process proceeds to step S325. Where determined as a collision with a wall or another NPC, then in step S323 an impact sound is generated and then in step S324 the NPC coordinate (X, Y, Z) is returned to the last-time coordinate (Px, Py, Pz), and the process advances to the step S325.

In step S325, a current position status of NPC is detected and stored in the work RAM 26. After step S325 it is determined in step S326 whether the player character has collided with a wall or not. If no collision against wall is determined, the process proceeds to step S329. If a collision with a wall is determined, then in step S327 an impact sound is generated and then in step S328 the player character coordinate (X, Y, Z) is returned to the last-time coordinate (Px, Py, Pz), and the process advances to step S329.

In step S329, a current position status of the player character is detected and stored in the work RAM 26. After step S329, it is determined in step S330 whether the player character has collided with an NPC or not. If an collision against an NPC is determined, a process is made in step S331 to vanish the NPC. After step S331, it is determined in step S332 whether all the NPCs have been vanished or not.

If all the NPCs have vanished is determined, a game clear process is executed in step S333. When no collision with an NPC is determined in step S330 or when all the NPCs have not vanished is determined in step S332, the process proceeds to step S335. In step S335 it is determined whether the player character has fallen in a hole or not. If determined fallen in a hole, a game over process is effected in step S334. Where the determination is not fallen in a hole, the impact process is ended.

Figure 47:
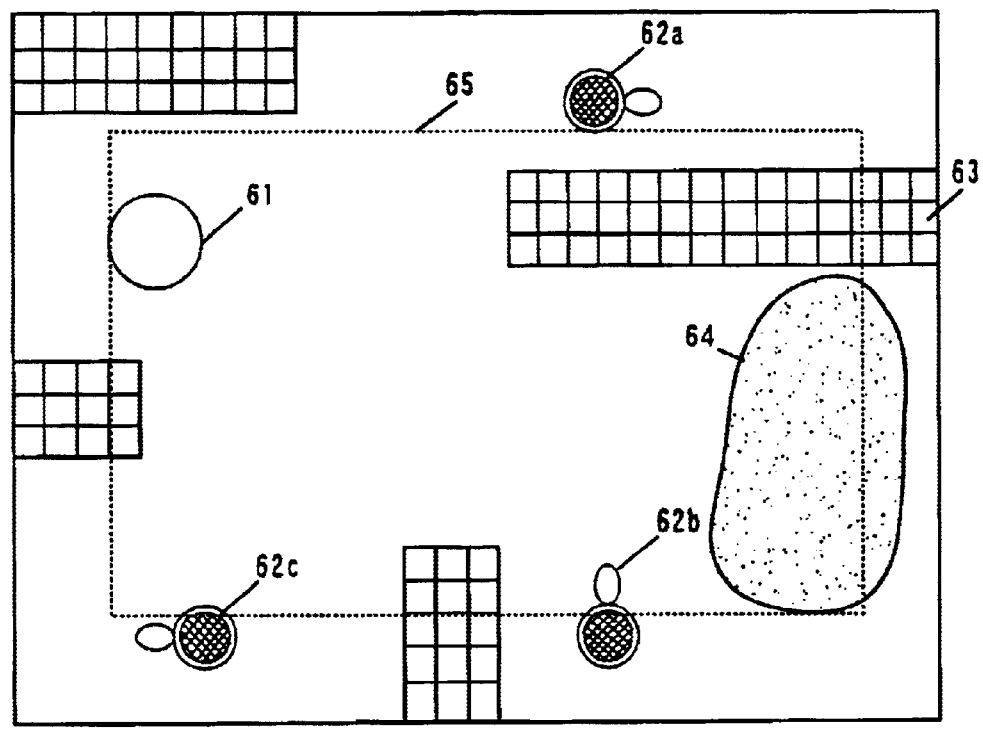
FIG. 47 is an illustrative view showing screen scroll (before scroll)
Figure 48:
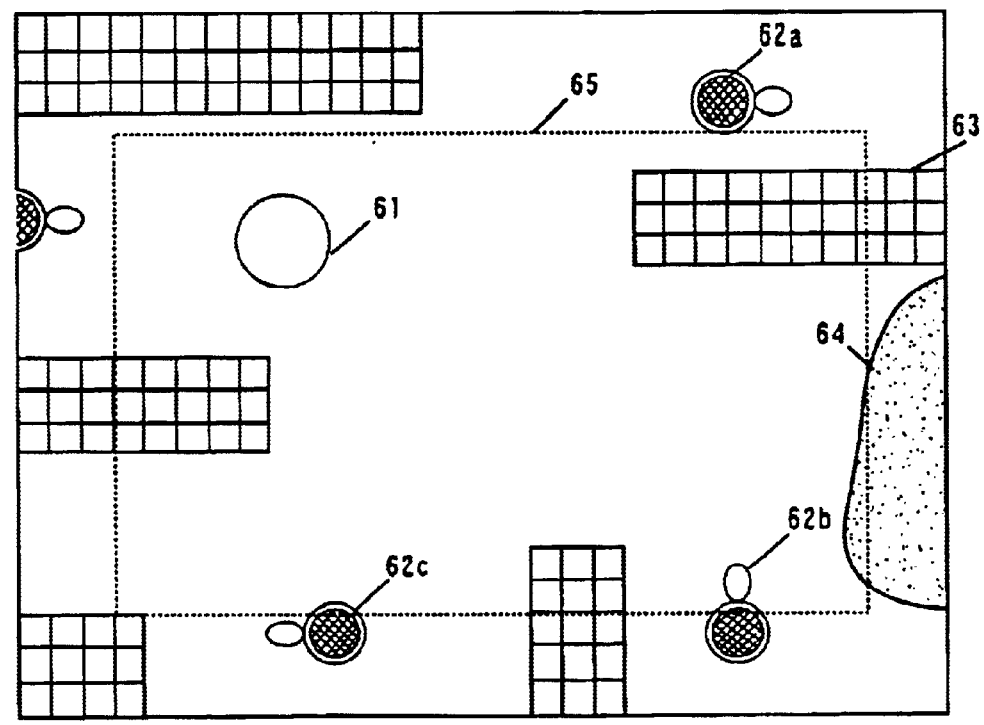
FIG. 48 is an illustrative view showing screen scroll (after scroll)

FIGS. 47 and 48 each show one example of a scene showing on-screen scroll. In the scene, there are displayed a ball as an example of a player character, tortoises 62a–62c as examples of NPC, and a wall 63 and hole 64 forming a maze. The dotted lines 65 show a limit of screen scroll (actually, the dotted lines 65 will not be displayed on the LCD 12). The game map is a virtual map that is broader than LCD 12 display region, as stated before. On the LCD 12 is displayed part of a game map around the player character 61. When the player character 61 is moving to an outer region of the dotted lines 65, the game map display region being displayed on the LCD 12 is moved thereby scrolling the game scene. At this time, player character 61 and NPC 62 are moved to and displayed in a position toward a center of a scene by a corresponding amount to scrolling. In this manner, screen scrolling makes possible game play with a broader game map. For example, if the player character is going beyond the dotted line 65 to a left side area as shown in FIG. 47, the game map region in display is scrolled to left so that the player character 61 and NPC can be moved to and displayed in a position by a corresponding amount to scrolling (FIG. 48). Note that the scroll rate may be changed depending upon a magnitude of tilt input.

Figure 49:
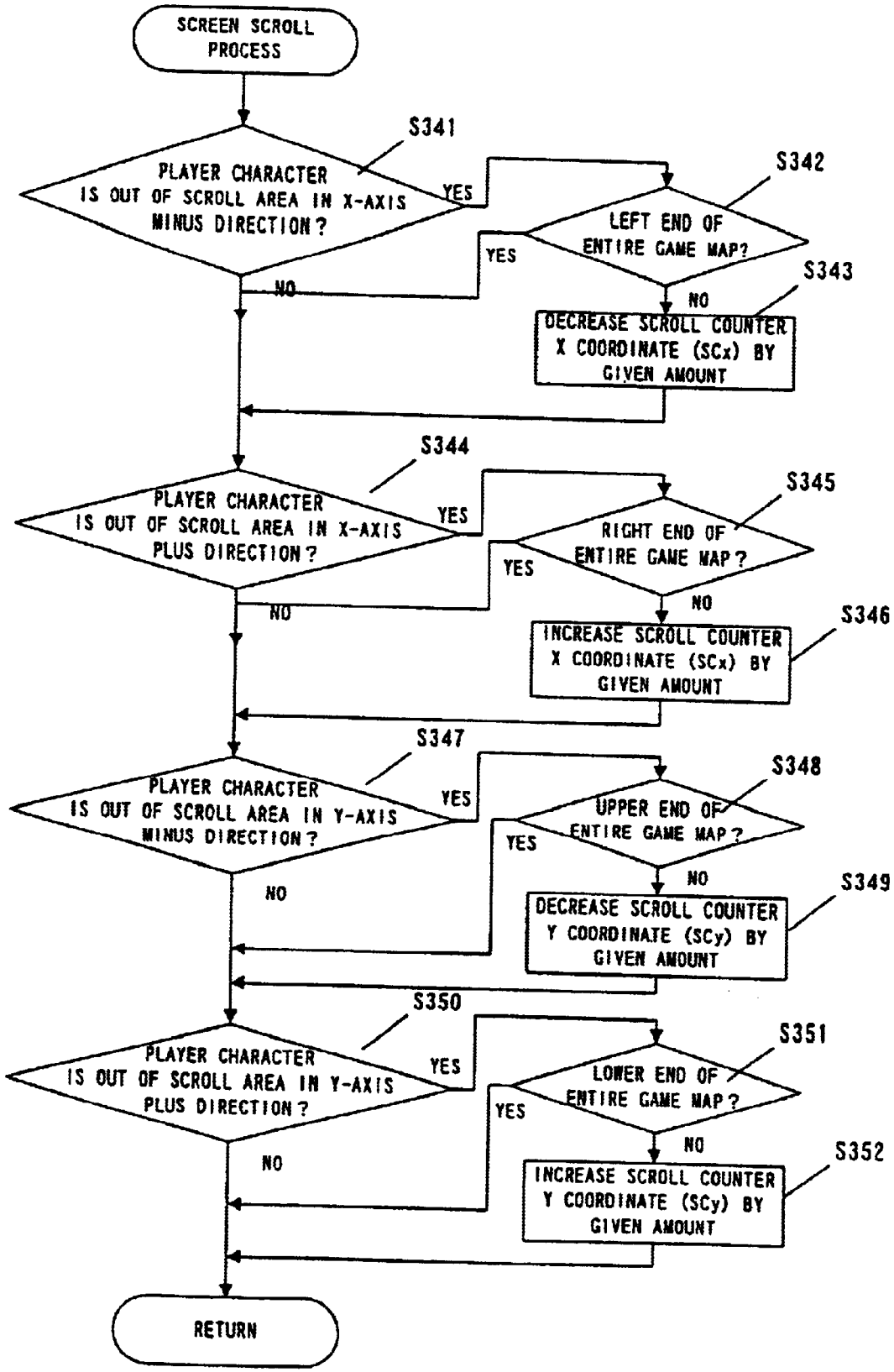
FIG. 49 is a flowchart showing a screen scroll process.

FIG. 49 shows a flowchart of a screen scroll process. In step S341 it is determined whether the player character is out of a scroll area in an X-axis minus direction or not. Here, the scroll area refers to an area as surrounded by the dotted lines 65 shown in FIG. 47. If determined not out of the area with respect to the X-axis minus direction, the process advances to step S344. If determined out of the area in the X-axis minus direction, it is then determined in step S342 whether the current display area is a left end region of the game map or not. If determined as a left end region, the process advances to step S344. If determined not a left end region, then in step S343 a scroll counter X coordinate (SCx) memorized in the display RAM 25 is decreased by a given amount and then the process proceeds to step S344.

In step S344 it is determined whether the player character is out of the scroll area with respect to the X-axis plus direction or not. When determined not out of the area in the X-axis plus direction, the process advances to step S347. When determined out of the area in the X-axis plus direction, it is determined in step S345 whether the current display region is a right end region of the game map or not. If determined as a right end region, the process advances to step S347. When determined not a right end region, in step S346 the scroll counter X coordinate (SCx) is increased by a given amount and then the process proceeds to step S347.

In step S347 it is determined whether the player character is out of the scroll area in a Y-axis minus direction or not. If determined not out of the area in the Y-axis minus direction, the process advances to step S350. When determined out of the area in the Y-axis minus direction, it is determined in step S348 whether the current display region is an upper end region of the game map or not. If determined as an upper end region, the process proceeds to step S350. When determined not an upper end region, in step S349 a scroll counter Y coordinate (SCy) is decreased by a given amount and then the process proceeds to step S350.

In step S350 it is determined whether the player character is out of the scroll area in a Y-axis plus direction or not. When determined not out of the area in the Y-axis plus direction, the screen scroll process is ended. When determined out of the area in the Y-axis plus direction, it is determined in step S351 whether the current display region is an lower end region of the game map. When determined as a lower end region, the screen scroll process is ended. When determined not a lower end region, in step S352 the scroll counter Y coordinate (SCy) is decreased by a given amount and then the screen scroll process is ended.

Although the above embodiment is for enjoying a game by one player, a plurality of portable game apparatuses may be connected through utilizing communication cables or radio communication to allow a plurality of players to enjoy a game. For example, the game characters or game map (game world) may be shared by a plurality of players so that a change in a game character or game map based on certain player's operation is reflected upon other players' portable game apparatuses.

As one concrete example, one player may tilt the portable game apparatus to provide a tilt in a play space on a game map while another player tilt the portable game apparatus to operate a game character (ball) in a moving direction. Thus, various games can be considered. That is, an interesting game is to be provided that, in a play space operated by one player, a ball is moved by operation of another player.

It can be considered as another example that roles are allotted to a plurality of players in controlling one character. For example, one player may tilt the portable game apparatus to thereby control a ball moving direction and another player input an acceleration to the portable game apparatus in the Z-axis direction to jump, so that a game course can be cleared by cooperation of the both.

Also, although in the above embodiment the game characters are controlled based only on an output of the acceleration sensor, the game characters or the like may be controlled in movement and/or motion by a combination of outputs of the operation switch and acceleration sensor.

For example, it can be considered in a tin ball game to operate such that a flipper hits back ball when pressing an operation switch while tilting or jolting the portable game apparatus to move and control the ball.

For an object fall game as represented by a Tetris game wherein an object falls down from above, it is possible to contemplate a game that an object is rotated by operation of an operation switch. An object is moved at high speed due to impact input or an object is varies in outer shape by inputting an acceleration in the Z-axis direction, while changing an object moving direction due to tilting or jolting the portable game apparatus.

Furthermore, although the above embodiment was provided with the acceleration sensor on the cartridge, the acceleration sensor may be provided integral with the game machine main body. Where the acceleration sensor is provided on the game machine main body side, there is no need to provide an acceleration sensor on a cartridge-by-cartridge basis thus reducing cartridge cost. Meanwhile, the information storage medium used for the portable game apparatus is not limited to a cartridge, it may be card-formed storage medium alike an IC card.

Although in the above embodiment the neutral position data was memorized in the work RAM 26 to allow setting for each game play, it may be memorized in the backup RAM 35 not to lose the data even upon turning off the portable game apparatus power so that the same data can be utilized in the next game play.

In the above embodiment, the neutral position was determined by the player. Alternatively, neutral position data may be previously stored in a game program to be utilized. Also, a plurality of ones of neutral position data may be stored so that the player can select any one of them.

Although the above embodiment was explained on the case that a tilt of the portable game apparatus is detected by the acceleration sensor and utilized for controlling the movement of the game characters, an movement of the portable game apparatus may be detected and utilized for game map scrolling.

Although in the above embodiment the game map was scrolled only when the player character is moving beyond a given range, the player character may be displayed in a fixed fashion and the game map be scrolled in place of moving the player character depending upon tilt of portable game apparatus.

In the above embodiment, the game characters were only the player character (ball) and enemy characters (tortoises). In addition to these, it is possible to provide NPCs (non-player characters), such as ally characters to appear for assisting the player character or neutral characters. Although these NPCs are moved by self control based on a game program (there may include NPCs not to be moved by self-control), they may be moved or changed in shape according to player's operation (tilt or impact input).

The above embodiment explained on the case that the acceleration sensor is provided on the portable game apparatus. It is however possible to apply the technical idea as explained in the above embodiment for a case that an acceleration sensor is provided on a controller of a video game apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable game apparatus, comprising:
   a game console containing a display and a processor for displaying a game image on the display in accordance with a game program, said game console having a connector for enabling
   a game cartridge to be operably connected therewith;
   a game cartridge containing a memory having a game program stored thereon, said game cartridge being connectable to the game console via the connector; and
   an accelerometer contained within the game cartridge and operable to detect acceleration in response to movement or tilt of the game cartridge and to provide a control signal to the game console;
   wherein the game image on the display is changed based on the control signal from the accelerometer.

2. A portable game apparatus as defined in claim 1, wherein the connector is a slot and said game cartridge has a shape that enables it to be inserted into said slot.

3. A portable game apparatus as defined in claim 1, wherein the game image includes a game character, and the game character is controlled based on the control signal from the accelerometer.

4. The portable game apparatus as defined in claim 1, wherein the game console is a hand-held console.

\* \* \* \* \*